United States Patent [19]
Nakatsuka et al.

[11] Patent Number: 5,748,202
[45] Date of Patent: May 5, 1998

[54] IMAGE DATA PROCESSOR FOR PROCESSING PIXEL DATA IN BLOCK BUFFER

[75] Inventors: Yasuhiro Nakatsuka, Toukai-mura; Keisuke Nakashima, Hitachi; Shigeru Matsuo, Hitachinaka; Masahisa Narita, Hitachi; Koyo Katsura, Hitachioota; Hidehito Takewa, Hitachi; Tomoaki Aoki, Oomiya-machi, all of Japan

[73] Assignees: Hitachi, Ltd., Tokyo; Hitachi Engineering Co., Ltd., Ibaraki, both of Japan

[21] Appl. No.: 498,055

[22] Filed: Jul. 5, 1995

[30] Foreign Application Priority Data

Jul. 8, 1994 [JP] Japan .................. 6-157183
Sep. 5, 1994 [JP] Japan .................. 6-210923
Sep. 20, 1994 [JP] Japan .................. 6-224740

[51] Int. Cl.⁶ .................................................. G06F 12/00
[52] U.S. Cl. .................. 345/514; 345/509; 345/522; 345/525; 345/441
[58] Field of Search ................................. 395/118, 119, 395/141, 501, 503, 507, 509, 511, 514, 522, 525; 345/149, 186, 189, 203, 418, 419, 441

[56] References Cited

U.S. PATENT DOCUMENTS

| | | |
|---|---|---|
| 4,303,896 | 12/1981 | Slabinski . |
| 4,694,351 | 9/1987 | Nakamura et al. . |
| 5,377,312 | 12/1994 | Kobayashi .................. 395/116 |
| 5,384,861 | 1/1995 | Mattson et al. . |
| 5,390,029 | 2/1995 | Williams et al. .................. 358/448 |
| 5,390,149 | 2/1995 | Vogley et al. . |

FOREIGN PATENT DOCUMENTS

A-61-261969 of 1986 Japan .
A-5-120114 of 1993 Japan .
A-5-258040 of 1993 Japan .

OTHER PUBLICATIONS

Andy Goris et al. "A Configurable Pixel Cache for Fast Image Generation" (IEEE CC & F, Mar. 1987, pp. 24–32.

*Primary Examiner*—Matthew M. Kim
*Assistant Examiner*—U. Chauhan
*Attorney, Agent, or Firm*—Antonelli, Terry, Stout & Kraus, LLP

[57] ABSTRACT

In a device and system which perform processing, (displaying and outputting) of image data, the amount of data transferred between a memory holding the image data and a processor processing the image data is limited, thereby a great amount of data can be processed at high speed.

16 Claims, 34 Drawing Sheets

| 1320 | Xs, Ys, Zs, Rs, Gs, Bs, Y <br> ΔXy, ΔZy, ΔRy, ΔGy, ΔBy <br> ΔZx, ΔRx, ΔGx, ΔBx |
|---|---|

| 1310 | X | Y | Z | R | G | B | Flag |
|---|---|---|---|---|---|---|---|
| 1311 | 1 | 0 | 1 | 1 | 2 | 1 | 111 |
| 1312 | 3 | 1 | 4 | 2 | 5 | 5 | 110 |
| 1313 | 2 | 2 | 4 | 0 | 2 | 6 | 101 |
| 1314 | ? | 3 | ? | ? | ? | ? | 000 |

```
Flag
000 ··· idle
100 ··· waiting
101 ··· executing
110 ··· blocked
111 ··· finished
```

(a) Left most point = Highest point (b) Left most point = Lowest point (c) Left most point ≠ Highest Point nor Lowest point Triangle (P1, P2, P0)

1110 — $\begin{bmatrix} P0 = (X0, Y0, Z0, R0, G0, B0) \\ P1 = (X1, Y1, Z1, R1, G1, B1) \\ P2 = (X2, Y2, Z2, R2, G2, B2) \end{bmatrix}$ Triangle (P1, P2, P0) → Triangle (P0, P3, P1) and Triangle (P1, P3, P2)

P3 = P0 + (Y1 - Y0) / (Y2 - Y0) * (P2 - P0)

# of block access: 7

| 1320 | param, current block, pivot block, direction, next pivot |
|---|---|

| 1310 | Xs | Xe | Lflag | Rflag |
|---|---|---|---|---|
| 1311 | x00 | x01 | 111 | 111 |
| 1312 | x05 | x14 | 111 | 110 |
| 1313 | x09 | x18 | 111 | 101 |
| 1314 | ? | ? | 000 | 000 |

```
Flag
000 ··· idle
100 ··· waiting
101 ··· executing
110 ··· blocked
111 ··· finished
```

FIG. 28

| COMMAND | OPERATION CONTENTS | |
|---|---|---|
| 3D TRIANGLE DRAW USED FOR DRAWING POLYGON WITH GOURAUD SHADING | TRIAGL Addr,x1,y1 x2,y2,p,dpx,dpy 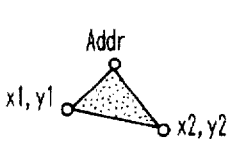 | Addr:MEMORY ADDRESS OF DRAW STARTING POINT x1,y1:RELATIVE COORDINATE APEX FROM Addr x2,y2:RELATIVE COORDINATE APEX FROM Addr p:DRAW DATA OF DRAW STARTING POINT dpx:VARIED COMPONENT OF 1 DOT IN X DIRECTION dpy:VARIED COMPONENT OF 1 DOT IN Y DIRECTION |
| 3D STRAIGHT LINE COPY USED FOR DRAWING POLYGON WITH TEXTURE MAPPING | CPLINE3 Addr1,sx1, Addr2,sx2,Sy2 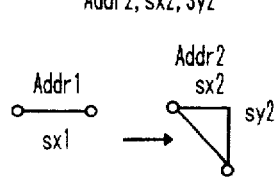 | Addr1:MEMORY ADDRESS OF REFERENCE START POINT sx1:X DIRECTION DOT NUMBER OF REFERENCE LINE Addr2:MEMORY ADDRESS OF DRAW STARTING POINT sx2:X DIRECTION DOT NUMBER OF DRAW LINE sy2:Y DIRECTION DOT NUMBER OF DRAW LINE |
| 3D STRAIGHT LINE DRAW | LINE3 Addr,sx,sy,p,dp 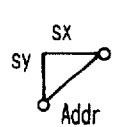 | Addr:MEMORY ADDRESS OF DRAW STARTING POINT sx:X DIRECTION DOT NUMBER OF DRAW LINE sy:Y DIRECTION DOT NUMBER OF DRAW LINE p:DRAW DATA OF DRAW STARTING POINT dp:DRAW DATA VARIED COMPONENT OF 1 DOT |
| 2D STRAIGHT LINE DRAW | LINE2 Addr,sx,sy,p 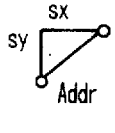 | Addr:MEMORY ADDRESS OF DRAW STARTING POINT sx:X DIRECTION DOT NUMBER OF DRAW LINE sy:Y DIRECTION DOT NUMBER OF DRAW LINE p:DRAW DATA OF DRAW STARTING POINT |
| 2D STRAIGHT LINE COPY WITH ENLARGEMENT, REDUCTION AND ROTATION | CPLINE3 Addr1,sx1,sy1, Addr2,sx2,Sy2 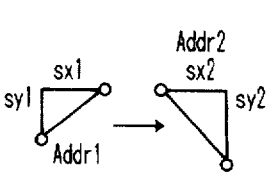 | Addr1:MEMORY ADDRESS OF REFERENCE START POINT sx1:X DIRECTION DOT NUMBER OF REFERENCE LINE sy1:Y DIRECTION DOT NUMBER OF REFERENCE LINE Addr2:MEMORY ADDRESS OF DRAW STARTING POINT sx2:X DIRECTION DOT NUMBER OF DRAW LINE sy2:Y DIRECTION DOT NUMBER OF DRAW LINE |
| BitBLT | BITBLT Addr1,sx,sy, Addr2 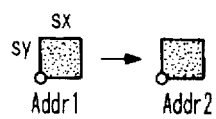 | Addr1:MEMORY ADDRESS OF REFERENCE START POINT sx:X DIRECTION DOT NUMBER OF REFERENCE LINE sy:Y DIRECTION DOT NUMBER OF REFERENCE LINE Addr2:MEMORY ADDRESS OF DRAW STARTING POINT |

IMAGE DATA PROCESSOR FOR PROCESSING PIXEL DATA IN BLOCK BUFFER

BACKGROUND OF THE INVENTION

The present invention relates to an image processing device and a system using the same, which is capable of performing graphics processing, drawing processing and display processing at high speed.

More specifically, the present invention relates to an information terminal machine, such as a facsimile machine, printer, graphics device, portable personal terminal machine, navigation machine and device, and to an image processing system which performs inputting, processing, editing, accummulating, communicating, outputting and displaying of image data using the information terminal machine.

In particular, the present invention relates to an image processing device and a system using the same which can minimize the amount of same data being transferred between a memory device and the image processing device to thereby perform a high speed processing.

Further, in particular, the present invention relates to a graphics drawing method, and to an image processing device and a system using the same in which, transferred in order to minimize the amount of data being transferred between a memory device and the image processing device, reduces drawing suppression processing (hidden surface processing) due to graphics overlapping, and which, in particular, performs complex image processing and three dimensional graphics display processing at high speed.

Further, in particular, the present invention relates to a method which suppresses an increase of components in an image processing system having high speed access to a memory thereby reducing the construction cost thereof.

Various conventional system for effecting data transfer between a memory, which holds image data, and an image data processor and/or an image processing device, which processes the image data have been developed. However, these conventional system have inherent problems with regard to their processing speed, such for accessing and drawing, in that high speed processing and real time processing in a device or a system which is required to process a great amount of data have prove to be insufficient.

A proposal in which image data transferred between a memory device and an image processing device is drawn and processed in blocks representing a pixel aggregate is disclosed in Andy Goris et al. "A Configurable Pixel Cache for Fast Image Generation" (IEEE, Computer Graphics and Application, May 1987, pp. 24–32), which is hereinafter referred to as the Goris et al publication.

According to the Goris art, pixel data is fetched in block on demand into a pixel cache and a drawing process is executed such that a prefetch effect is limited within a block unit.

Even in a case when a drawing processing is performed while crossing the boundary between blocks, since the pixel data is generated via a common rasterizing mode, a prefetch for pixel data in the subsequent block is started.

Therefore, if the capacity of the pixel cache is small, in response to the prefetch of the pixel data in the subsequent block, the pixel data in the previous block is first pushed out of the pixel cache and then the pushed out pixel data need to be accessed via rasterizations same which causes a problem in that frequent memory access is necessitated.

In particular, when a coloring-up darkening process is performed for a triangle, although it is necessary to generate pixel data two-dimensionally and to process the same, the memory access is performed one dimensionally therefore even when performing a drawing processing of nearby pixel data, the prefetched data as indicated above can not be utilized which causes an inefficient memory access in in other words causes a problem in that an additional memory band width is necessitated.

Further, in a graphics architecture in which a memory area for drawing processing is arranged in a main memory, a sufficient memory band width has to be provided, which causes a problem in that the memory can not be efficiently used.

A three dimensional graphics display device generally uses a display method in which an object to be displayed is divided into small three dimensional graphics, such as triangles and quadrangles and is modeled, geometrico arithmetic operation is performed on these small graphics, based on their viewed direction, and, based on the resultant arithmetic values, the respective graphics are projected on the two dimensional coordinate of a display device such as a. At this time, however, it is required to check for overlapping of the respective graphics in their depth direction and to prevent drawing of hidden graphics on a frame buffer.

As a conventional method of judging graphics an overlapping Z buffer algorithm, in other words depth buffer algorithm, is generally used. This conventional method is, for example, explained in W. M. Newman et al. "Dialog Type Computer Graphics (H) 2nd edition" translated by Setsuo Ohsuga (McGraw-Hill Book Company, 1984, pp. 483–441), which is hereinafter referred to as the Newman et al publications. According to this method, depth information is provided for respective pixels every time when drawing respective pixels, depth information of a pixel to be drawn is compared with the depth information of already drawn pixels, and when the pixel to be drawn is located more close with respect to the screen, the pixel is permitted to be drawn, and conversely, when the pixel to be drawn is located deeper than the already drawn pixel, the pixel is prevented.

Another method in which overlapping graphics is checked via geometric calculation is, for example, explained on pages 442–443 of the Newman et al publication. In this method, a circumscribed rectangle is defined for each of the polygons to be drawn and overlapping of these circumscribed rectangles is judged, however when the respective circumscribed rectangles do not overlap each other, the judgement with regard to their depth is omitted.

On the other hand, a method which avoids the necessity of the Z buffer is explained in James D. Foley et al. "Fundamentals of Interactive Computer Graphics" translated by Atsumi Imamiya (Published by Japan Computer Association, 1982, pp. 569–572), which is hereinafter referred to as the Foley et al publication. This method is based on depth sort algorithm in which the drawing is started from the graphic in the deepest location and graphics close to the viewer are successively drawn while overlapping graphics.

Further, U.S. Pat. No. 4,303,986 discloses a provision of a selective writing means for a memory which stores two dimensional images.

In the method disclosed in Newman et al publication, Z buffer is used for judgement of graphics overlapping so that this method necessitates depth information for every pixel and therefore requires a Z buffer (frame buffer) of large capacity. For example, assuming a standard system having, 34 bits for color information and 16 bits for Z buffer of a screen having 1024×768 pixels a memory of about 4M bits in total is necessitated, among which a memory of about 1.4M bits is needed for Z buffer algorithm and a memory of about 1.6M bits is needed for the Z buffer. Further, in the conventional Z buffer algorithm the same pixel is accessed as many times as the number of graphics that overlap, and every time a drawing is performed the Z buffer content has to be read and the read Z value has to be compared, among which comparison only one comparison result is significant. For this reason, useless memory access is necessitated, which makes an improvement of drawing performance difficult.

On the one hand, the method disclosed in Foley et al publication which avoids any need for the Z buffer, is effective with regard to memory capacity reduction however, since graphics are sucessively drawn in an over-lapping manner from the graphic in the deepest location, the graphic closest to the viewer sometimes can not be drawn depending on the number of graphics to be drawn such that the third can not be applied to a system which requires a real time performance.

With regard to a conventional image processing system, for example, JP-A-5-258040(1993), and JP-A-5-120114 (1993) which is hereinafter referred to as sixth disclose examples of a data processing system which makes use of a synchronous DRAM permitting high speed data transfer.

However, these image processing systems are not because they require excessive time when a plurality of image processings are performed via multi tasks. Further, when a bus control is performed via a time slot method by making use of a synchronous DRAM, a mishit control is frequently generated which causes a problem in that an increase of the throughput is limited.

Further, GAIN (Technical Report Published by Hitachi, Ltd. Seminconductor Division, No.96,1993. 1, pp. 6–11) discloses an example for reducing the size and cost of the device by making use of a built-in RISC (Reduced Instruction Set Computer). However, the paper is silent with regard to a specific memory access method and bus utilization method which realize a high speed image processing.

Still further, JP-A-4-107056(1992) discloses a high speed processing method in which a bus which transfers image data from a decoder to a printer is made independent from a MPU bus.

Still further, in a conventional facsimile machine, an example of an image processing system, is disclosed in Shuichi Fujikura et al. "Developement of a LSI for Facsimile Image Processing" (Oki Denki Research and developement Report October, 1992. No. 156, vol. 59, No. 4, pp. 65–70) having via a processor and high speed memory dedicated for image processing in an image input and output unit in which, data distortion is corrected to thereby realize images of high quality. However, in association with gathering of control units each formed by a one chip microcomputer the space rate occupied by the image processing unit increases, which adversely affects the cost thereof.

Still further, the image processing system in a recent business use facsimile machine tends to accelerate high image quality, high processing speed and large memory capacity such that LSIs dedicated for image processing and for coding are frequently constituted to have their own respective SRAMs. Accordingly, there arises a problem of increased cost of the devices.

Still further, a conventional image processing system used for a facsimile machine, a printer and a graphics device, as disclosed in JP-A-61-261961(1986) has, a SRAM (static memory) used for local processing by referring to nearby pixels at high speed and a DRAM (dynamic memory) used for storing data such as symbol data and font data, operating at low speed, but having a large memory capacity. Therefore, the improssibility of integrating the above two types of memories is a significant problem in view of device size reduction, integration into a single LSI, device constitution, device cost and product series developement.

Still further, one of the reasons why high speed image processing could not be achieved with the above conventional art is that the image inputting and outputting processing and the communication processing function are required to have an extremely high real time property as well as a high speed bus throughput of about 4~20 MB/s such that their processings have to be performed via a dedicated processor and a local processing use dedicated memory independent from a main memory.

Due to the developement of the semiconductor microma-chining technology and improvement microprocessor architecture, a high speed processor, such as, RISC, and a device having an operating speed more than 100 MHz, such as a RAMBUS and synchronous DRAM have appeared on the market. For example, the synchronous DRAM has already begun to draw attention as a memory having a large capacity operable at high speed. In contract to the conventional DRAM, a synchronous DRAM can input and output data, address and control signals in synchronism with clocks to thereby realize a high speed data transfer comparable with the conventional SRAM, in addition to the fact that a synchronous DRAM having a larger memory capacity than the conventional DRAM can be realized at a low cost.

There are marked characteristics in image communication and processing including, advantageous characteristics with regard to the construction thereof which involve regularity in address renewal, such as the continuity of address to be processed, easy previous forecasting of proseccing quantity and simple processing content and limited nearby influence of the processed result, and disadvantageous characteristics representing an intense real time requirement and a possible system break-down when not completing the processing within a predetermined time. However, no devices and systems have been proposed until now which optimize the processing in view of the above advantageous and disadvantageous characteristics, so that it is necessary to provide a device and a system therefor which take into consideration the above advantageous and disadvantageous characteristics.

SUMMARY OF THE INVENTION

An object of the present invention is to provide a device which processes a great quantity of data at high speed and in real time, and a system using the device.

Another object of the present invention is to provide an image processing device which minimizes the amount data being transferred between a memory device and the image processing device and performs high speed processing, and a system using the device.

Still another object of the present invention is to provide a graphics drawing method which, in order to minimize, data transfer between a memory device and an image processing device, reduces drawing suppression processing (hidden surface processing) due to overlapping of graphics and, in particular, performs complex image processing and three dimensional graphics display processing at high speed, and an image processing device and a system using the method.

A further object of the present invention is to provide a device and a system which avoid an increase of components in an image processing system which accesses a memory at high speed so as to achieve low cost.

A still further object of the present invention is to provide a graphics drawing method and device, and a three dimensional graphics display method and device which make it possible to reduce the capacity of data storage area in which drawing use graphics data is to be stored.

A still further object of the present invention is to provide a graphics drawing method and device, and a three dimensional graphics display method and device which permits high speed drawing processing.

A still further object of the present invention is to provide a high speed image processing system of low cost by integrating an image inputting and outputting process, a coding and decoding process and a communication process, which are conventionally processed independently, and further by integrating a high speed local processing use memory and a large capacity memory.

An aspect of the invention is characterized, by the fact that, based on the processing status of pixel data of every one of respective rows in a block buffer which holds pixel data accessed from a memory by a block unit, a command with regard to image processing is executed and the processing of the pixel data is performed.

Further, an aspect of the present invention is characterized, by the fact that based on the processing status information of the pixel data to be processed, the pixel data to be processed next is specified.

Further, an aspect of the present invention is characterized, by the fact that the device according to the present invention comprises a command buffer which holds commands indicating processings relating to drawings, a block buffer which accesses pixel data held in a memory in every block unit and holds the same, a pixel data processing unit which executes the processing of the pixel data in the block buffer based on the command and detects the processing status of the pixel data at boundaries of the respective rows in the block buffer and a status register which holds processing status information indicating the processing status of the pixel data at the boundaries of the respective rows and, in that the processing of the pixel data in each of the blocks is executed based on the commands and the processing status information.

An aspect of the present invention is characterized by the fact that, since the commands relating to the image processing are executed and the processing of the pixel data is performed on the basis of the processing status of the pixel data in the block buffer all of the pixel data in a block unit can be processed without recourse to the order of the raster development, the number of access times between a memory and an image processing processor can be reduced and a high speed image processing and drawing processing can be realized.

An aspect of the present invention is characterized by the fact that, since the pixel data to be processed next is specified on the basis of the processing status information of the pixel data to be processed, all of the pixel data in a block unit can be processed without recourse to the order of the raster developement, the number of access times between a memory and an image processing processor can be reduced and a high speed image processing and drawing processing can be realized.

An aspect of the present invention is characterized by the fact that, since the processing status information of the pixel data to be processed is held in every row unit within each of the blocks, the capacity of the status register can be reduced and the pixel data to be processed next can be specified.

An aspect of the present invention is characterized by the fact that, since the processing status information of the pixel data to be processed is held in every pixel data at the boundary with an adjacent block, the capacity of the status register can be reduced and the pixel data to be processed next can be specified.

An aspect of the present invention is characterized by the fact that, in order to reduce information for judging overlapping of graphics, a control data writing region is provided indicating whether or not a pixel is already drawn in a data storage region storing drawing use graphics data, control data flags are stored in the control data writing region, and, when the information of the control data writing region indicates that the drawing is not completed, the drawing is performed and otherwise the drawing is prohibited.

An aspect of the present invention is characterized by the fact that, when drawing successively a plurality of pixels based on the data of pixel groups relating to a three dimensional image, a control data writing region is provided indicating whether or not a pixel is already drawn in a data storage region storing drawing use graphics data of the respective pixels, when drawing of the respective pixels is commanded, a pixel to be newly drawn is designated depending on the control data in the control data writing region, the designated pixels are successively drawn and control data indicating that the drawing is completed is written in the control data writing region relating to the pixel of which drawing is completed.

An aspect of the present invention is characterized by the fact that, when drawing successively a plurality of pixels based on the data of pixel groups relating to a three dimensional image, a control data writing region is provided indicating whether or not a pixel is already drawn in a data storage region storing drawing use graphics data of the respective pixels, when drawing of the respective pixels is commanded, and only when control data indicating that a pixel is not yet drawn is added in the drawing use graphics data of the respective pixels extracted from the data storage region, will the drawing of the pixel be executed and control data indicating that the drawing be completed is added in the drawing use graphics data for the pixel and stored in the data storage region, and when control data indicating that the pixel is already drawn is added in the drawing use graphics data of the respective pixels extracted from the data storage region, redrawing of the pixel is prohibited.

An aspect of the present invention is characterized, by the fact that the device according to the present invention is applicable to devices in which, based on the data of pixel groups relating to images of a plurality of polygons, the pixels of the respective polygons are successively drawn.

An aspect of the present invention is characterized by the fact that the device according to the present invention is applicable to devices in which a graphics group in a form of graphics list containing image information of pixel groups relating to a plurality of polygon graphics having different depths is sorted according to the depth information relating to the depth of the respective graphics and the pixels of the respective graphics are successively drawn according to the order of the sorting.

Further, an aspect of the present invention uses a method in which, when performing drawing based on a graphics list containing image information of pixel groups relating to a plurality of polygon graphics having different depths, the graphics in the graphics list (display list) to be displayed are sorted in advance from those closest to the viewer of the screen and the respective graphics are drawn according to the order of the sorting. More specifically, an aspect of the present invention is characterized, by the fact that a graphics group in a form of a graphics list containing image information of pixel groups relating to a plurality of polygon graphics is sorted according to the depth information relating to depth of the respective graphics, the respective graphics are selected according to the order of the sorting, whether or not the drawing region of a polygon belonging to the selected graphics is contained in a drawing region of a polygon belonging to a graphic having a higher sorting order is judged according to the image information, a graphics which is judged as contained in the drawing region by the judgement is deleted from the graphics list, and when the drawing for the respective pixels of the graphics judged to be not contained, by the judgement is commanded, the drawing for the respective pixels of the graphics is executed based on the image information.

Further, an aspect of the present invention is characterized, in that in the course of executing the above graphics drawing method, when a drawing for the respective pixels of the graphics judged as not contained in the drawing region, judgement processing of the graphics list is commanded, the drawing use graphics data of the respective pixels are extracted from the data storage region storing the drawing use graphics data of the respective pixels only when a flag indicating that a pixel is not yet drawn is added in the extracted drawing use graphics data, the drawing for the pixel is executed and a flag indicating that the drawing is completed is added in the drawing use graphics data of the pixel and is stored in the data storage region and, when a flag indicating that a pixel is already drawn is added in the drawing use graphics data of the respective pixels extracted from the data storage region, the redrawing of the pixel is prohibited.

An aspect of the present invention is characterized by the fact that, when judging specifically the drawing region of a polygon belonging to the graphic list, a circumscribed rectangle for a polygon belonging to the graphics list and an inscribed rectangle for the polygon are respectively provided in correspondence to the drawing region, and whether or not a circumscribed rectangle relating to a selected graphic is hidden by an inscribed rectangle relating to a graphic having a higher order of sorting is judged.

Further, an aspect of the present invention is characterized, by the fact that a method is used in which a plurality of groups, each containing one image unit consisting of a plurality of polygons, are formed depending on their depth, graphics lists containing image information of the pixel groups corresponding to the polygon graphics are produced for every one of the respective groups, and when judging an overlapping of a graphic belonging to a graphics list, circumscribed rectangles for the graphics of the respective groups and inscribed rectangles for the graphics of the respective groups are respectively provided in correspondence to the drawing region, and, whether or not a circumscribed rectangle relating to the graphic of the selected group is hidden by an inscribed rectangle relating to a graphic of a group having a higher order of sorting is judged.

Further, an aspect of the present invention is characterized, by the fact that, in order to realize a high speed drawing processing by eliminating a Z comparison in a drawing processing based on a graphics list containing image information of pixel groups corresponding to a plurality of polygon graphics having different depths, the drawing regions for a plurality of graphics belonging to the graphics list are respectively provided, when drawing of the respective graphics is commanded, whether or not the drawing regions relating to the respective graphics belong to a drawing region relating to a graphic having a higher order of drawing is judged and a drawing for a graphic judged as not belonging to drawing region by the judgement is executed according to the image information.

An aspect of the present invention is characterized by the fact that based on a graphics list containing image information of the pixel groups corresponding to a plurality of polygon graphics having different depths drawing regions of a plurality of graphics belonging to the graphics list are provided, when drawing for the respective graphics is commanded, whether or not the drawing regions relating to the respective graphics belong to a drawing region relating to a graphic having a higher order of drawing is judged. A drawing of the graphic judged as not belonging to the drawing region by the judgement is executed according to the image information, when a drawing for the respective pixels of the graphic judged as belonging to the drawing region by the judgement is commanded, the drawing use graphics data of the respective pixels are extracted from the data storage region storing the drawing use graphics data of the respective pixels, and only when a flag indicating that a pixel is not yet drawn is added in the extracted drawing use graphics data, a drawing for the pixel be executed and a flag indicating that the pixel is already drawn is added in the drawing use graphics data of the pixel be added and stored in the data storage region and, when a flag indicating that the pixel is already drawn is added in the drawing use graphics data of the respective pixels extracted from the data storage region, redrawing of the pixel is prohibited.

An aspect of the present invention is characterized, by the fact that a plurality of groups, each containing a plurality of polygons as an image unit, are formed, depending on their depths, a graphics list containing image information of pixel groups corresponding to polygon graphics of the respective groups and circumscribed rectangles for the graphics of the respective groups in the graphics list are respectively provided in correspondence to the drawing regions, when drawing for the graphics of the respective groups is commanded, whether or not the circumscribed rectangles relating to the graphics of the respective groups belong to a circumscribed rectangle relating to a graphic of a group having a higher order of drawing is judged. A drawing for the graphic of the group judged as not belonging is executed according to the image information, and when a drawing for the graphic of the group judged as belonging is commanded, the drawing use graphics data of the respective pixels are extracted from the data storage region storing the drawing use graphics data of the respective pixels of the graphic belonging to the group, and only when a flag indicating that a pixel is not yet drawn is added in the extracted drawing use graphics data will a drawing for the, pixel be executed and a flag indicating that the pixel already drawn is added in the drawing use graphics data of the pixel be added and stored in the data storage region and when a flag indicating that the pixel is already drawn is added in the drawing use graphics data of the respective pixels extracted from the data storage region, redrawing of the pixel is prohibited.

An aspect of the present invention is characterized in that a method is used in which in the course of executing a graphics drawing method eliminating Z comparison, in order to judge an overlapping of graphics belonging to a graphics list circumscribed rectangles for a plurality of polygons are respectively provided correspondence to the drawing regions, and drawing for the respective polygons is commanded, whether or not the circumscribed rectangles relating to the respective polygons belong to a circumscribed rectangle relating to a polygon having a higher order of drawing.

An aspect of the present invention is characterized by a three dimension graphics display method displaying a three dimensional image on a display screen according to the drawing use graphics data obtained through one of the above graphics drawing methods.

Further, an aspect of the present invention is characterized by the fact that a graphics drawing device, in which information required for judging overlapping of graphics is reduced, is constituted by a data storage means in which graphics data relating to two dimensional graphics stored correspondence to pixel groups, as well as control data indicating whether or not the respective pixels already drawn are stored; a data extracting means which extracts designated graphics data and control data from the data storage means based on the image information of the pixel groups corresponding to a plurality of polygon graphics; a graphics data producing means which, when the control data extracted by the data extracting means indicates that drawing of a pixel is not completed, new graphics data are produced according to the image information, and, when the control data extracted by the data extracting means indicates that drawing of a pixel is completed, the production of new graphics data is eliminated; a drawing means which draws the graphics data produced by the graphics data producing means on the pixel designated by the data storage means; and a control data providing means which provides data representing that the drawing of the pixel is completed for the control data of the pixel which has been drawn by the drawing means among the control data in the data storage means.

Further, an aspect of the present invention is characterized, by the fact that the above device in which graphics are drawn based on the image information of the graphics list and in which information required for judging an overlapping of graphics is reduced, further comprises a graphics list storage means which stores a graphics list containing the image information of a pixel groups corresponding to a plurality of polygon graphics; a sorting means which sorts graphics groups in the graphics list stored in the graphics list storage means according to depth information relating to depth of respective graphics; and a means for transferring the image information relating to the sorted graphics by the sorting means to the data extracting means.

Further, an aspect of the present invention is characterized, by the fact that a graphics drawing device in which only graphics not overlapping other graphics are extracted among the graphics list, comprises a data storage means in which graphics data relating to two dimensional graphics is stored correspondence to pixel groups as well as control data indicating whether or not the respective pixels already drawn are stored; a graphics list storage means which stores a graphics list containing image information of the pixel groups corresponding to a plurality of polygon graphics; a sorting means which sorts graphics groups in the graphics list stored in the graphics list storage means according to depth information relating to the depth of the respective graphics; a region judgement means which judges, based on the image information, whether or not the drawing regions of polygons belonging to the sorted graphics by the sorting means are contained in a drawing region of a polygon belonging to a graphic having a higher order of sorting; a deleting means which deletes the graphics judged as contained by the region judgement means from the graphics list; a graphics data producing means which produces graphics data relating to graphics judged as not contained by the region judgement means for every one of the pixels according to the image information; and a drawing means which draws the graphics data produced by the graphics data producing means on the designated pixel in the data storage means.

An aspect of the present invention is characterized by the fact that the above graphics drawing device in which only graphics not overlapping others are extracted from the graphics list, further comprises a rectangle providing means which respectively provides circumscribed rectangles for the polygons belonging to the sorted graphics by the sorting means and inscribed rectangles for the polygons while correlating the data to the drawing regions and a region judgement means which judges the drawing region according to the rectangles provided by the rectangle providing means.

An aspect of the present invention is characterized by the fact that the above graphic drawing device in which the graphics list storage means includes a plurality of groups each containing one image unit consisting of a plurality of polygons depending on their depth and stores for every one of the groups graphics list containing the image information of the pixel groups corresponding to the respective pilygon graphics, further comprises a rectangle providing means which respectively provides circumscribed rectangles for the graphics of the groups belonging to the sorted graphics by the sorting means and inscribed rectangles for the graphics of the groups while correlating the data to the drawing regions and a region judgement means which judges the drawing region according to the rectangles provided by the rectangle providing means.

An aspect of the present invention is characterized by the fact that the graphics drawing device, in which Z comparison processing in the drawing processing is eliminated, comprises a data storage means which stores graphics data relating to two dimensional graphics while correlating the data to the pixel groups, as well as stores control data indicating whether or not the respective pixels are already drawn; graphics list storage means which includes a plurality of groups each containing one image unit consisting of a plurality of polygons depending on their depth and stores for every one of the groups, graphics list containing image information of the pixel groups corresponding to the respective polygon graphics; a sorting means which sorts the graphics groups in the graphics list stored in the graphics list storage means according to depth information relating to the depth of the respective graphics; a rectangle providing means which respectively provides circumscribed rectangles for graphics in a group belonging to the graphics of groups sorted by the sorting means and inscribed rectangles for the graphic in the group while correlating the data to the drawing regions; a region judgement means which judges whether or not the circumscribed rectangle relating to the graphic in the group sorted among the rectangles provided by the rectangle providing means is hidden by an inscribed rectangle belonging to a graphics in a group having a higher order of sorting; a graphics data producing means which produces for every one of the pixels the graphics data relating to only polygons in the graphics judged as not hidden by the region judgement means according to the image information; and a drawing means which draws the graphics data produced by the graphics data producing means on the pixel designated by the data storage means.

Similarly, an aspect of the present invention is characterized, by the fact that the graphics drawing device comprises a data storage means which stores graphics data relating to two dimensional graphics while correlating the data to the pixel groups storing control data indicating whether or not the respective pixels are already drawn; a rectangle providing means which based on graphics list containing the image information of the pixel groups corresponding to a plurality of polygon graphics having different depths provides circumscribed rectangles for the polygons belonging to the graphics list while correlating the data to the drawing regions; a region judgement means which judges whether or not the respective circumscribed rectangles provided by the rectangle providing means belong to a circumscribed rectangle having a higher order of drawing; a first graphics producing means which produces for every one of the pixels graphics data relating to the polygon judged as not belonging by the region judgement means; a data extracting means which, when judged as belonging by the region judgement means, based on the image information extracts the graphics data and control data designated by the data storage means; a second graphics data producing means which, when the control data extracted by the data extracting means indicates that the drawing is not completed, produces new graphics data according to the image information in the graphics list, and when the control data extracted by the data extracting means indicates that the drawing is already completed, eliminates production of new graphics data; a drawing means which draws the graphics data produced by the respective graphics data producing means on the pixels designated by the data storage means; and a control data providing means which provides data indicating drawing completion for the control data of the pixels drawn by the drawing means among the control data in the data storage means.

An aspect of the present invention is characterized by the fact that the respective means in the above respective graphics drawing devices are formed into a one chip LSI and are mounted on a common substrate.

Further, an aspect of the present invention is characterized, by the fact that a three dimensional graphics display device comprises a display device which displays a three dimensional image on a display screen according to the graphics data of the respective pixels drawn by drawing one of the above devices.

An aspect of the present invention is characterized by the fact that in the course of successively drawing the pixels in the respective graphics only when control data or a flag is stored as information representing that the drawing is not completed in a control data writing region, the drawing is executed according to the image information, and when control data or a flag is stored as information representing that the drawing is completed in the control data writing region, the redrawing is prohibited so that it is enough only to judge the information of the control data writing region for judging an overlapping of the graphics amount of information needed for judging the overlapping of the graphics can be limited and the capacity of the data storage region storing the graphics data can be reduced.

An aspect of the present invention is characterized by the fact that in the course of drawing respective graphics based on the graphics list, when a drawing region of a polygon belonging to the graphics list is contained in a drawing region of a polygon belonging to a graphic having a higher order of drawing, the former graphic is deleted from the graphics list and only a drawing for the respective pixel of the graphics judged as not contained is performed so that only graphics not overlapping others are extracted and a high speed drawing processing is achieved.

Further, an aspect of the present invention is characterized, by the fact that in the course of drawing the respective graphics, it is judged whether or not drawing regions of the respective graphics belong to a drawing region relating to a graphic having a higher order of drawing and drawing for the graphics judged as not belonged is executed according to the image information, such that Z comparison in the drawing processing is eliminated and a high speed drawing processing is achieved.

An aspect of the present invention is characterized, by the fact that in order to realize a high speed image processing system through parallel processing and use of a high speed memory access in the system, the processing performance of a CPU is not reduced even when a processor other than the CPU accesses the memory. Namely, in order to permit a plurality of processors to simultaneously access a memory, a bus use bit range for the respective processors is controlled.

Further, an aspect of the present invention is characterized, by the fact that in order for every module to control a memory independently at least one control line can be controlled separately.

Further, an aspect of the present invention is characterized, by the fact that in order to permit respective memory modules to access different row addresses, a control which permits a row address activating command to be selectively set in a memory is performed.

Further, an aspect of the present invention is characterized, by the fact that high quality image processing arithmetic in the image input and output processing is performed through a spacial filtering while making use of multi, valued information, coding and decoding processing arithmetic is performed through table retrieval based on variation point detection and a bit pattern, modem arithmetic in the communication processing is performed through digital filtering while making use of sum of product arithmetic, A one chip processor performing the above processings and constituted by a high speed RISC and an image processing core and a high speed memory are connected via a dedicated bus, and the processings and memory are integrated.

Further, an aspect of the present invention is characterized, by the fact that memories for the respective processings are mapped on a common memory address.

Further, an aspect of the present invention is characterized, by the fact that, in order to execute the respective processings in a multi, task manner, a register is provided which dynamically allocates bus occupying time for the respective processings depending on their predetermined processing loads so as not to drop below a minimum bus throughput for guaranteeing a real time operation for the respective processings. The register can be easily modified by software, and the set values can be modified, such as by the processing sequences and the operating modes.

Further, an aspect of the present invention is characterized, by the fact that, in order to enhance bus efficiency, a means is provided which predicts a change in the row address and issues in advance an address control command.

Further, an aspect of the present invention is characterized, by the fact that in order to reset effective data in an internal arithmetic register at the time of task switching, a means is provided which returns a read address and executes restarting of a processing.

An aspect of the present invention is characterized by the fact that, through control of the bus bit range by the processor, if no conflicts between bit ranges are caused, simultaneous access can be achieved.

An aspect of the present invention is characterized by the fact that, since the memory bus can be adjusted by the bit range, the CPU and the image processing use a processor which can access the memory in parallel, depending on the operation mode, and the processing can be continued with no overhead for mishits and high speed processing is achieved.

BRIEF DESCRIPTION OF THE DRAWINGS

FIG. 28 is a diagram for explaining commands issued by a graphics processor;

DETAILED DESCRIPTION OF THE PREFERRED EMBODIMENTS

Hereinbelow embodiments of the present invention are explained in detail with reference to the drawings.

Figure 1:
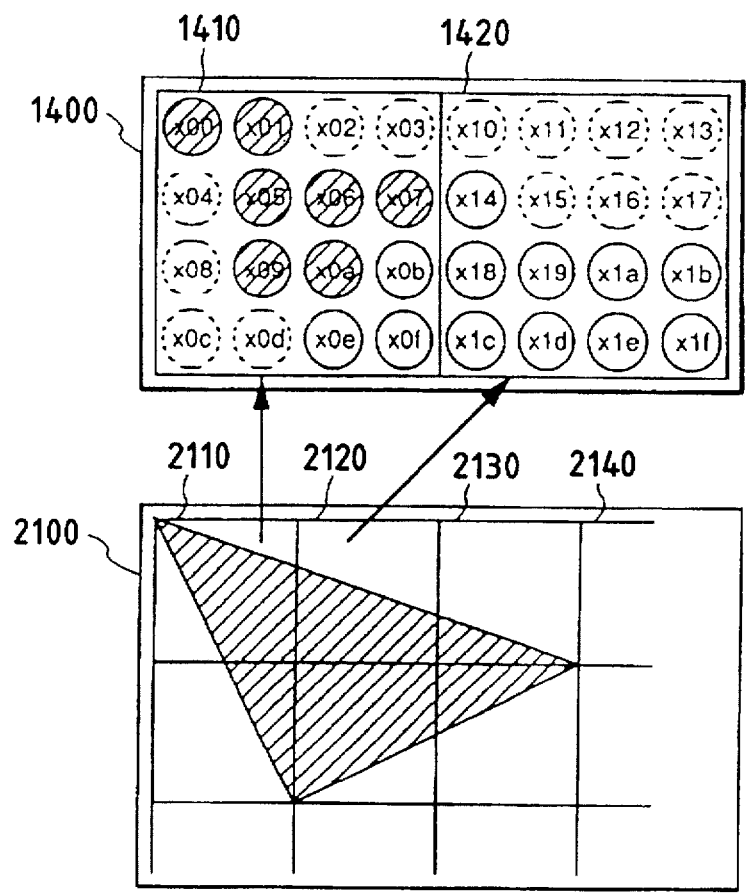
FIG. 1 is a diagram illustrating the concept according to the present invention in which pixels in a block are drawn with a given priority.

FIG. 1 shows an outline of a drawing process according to the present invention.

A drawing region 2100 is constituted by blocks 2110, 2120, 2130, 2140 and the like consisting of dimensionally arranged continuous addresses.

In the present embodiment, it is assumed that the size of one block can store a total of 16 pixel data the 4 in row direction and 4 in the column direction.

With regard to addresses of the respective pixel data, after the four pixel data on the first row, the four pixel data on the second row continues the data and after the four pixel data on the fourth row continues to the pixel data on the first row in the adjacent right side block as illustrated by blocks 1410 and 1420.

A copy of the block 2110, one of the blocks within the drawing region, is fetched into the memory region 1410 within a block buffer 1400 and is drawn therein.

During the drawing, the block 2120 to be drawn next and located to the adjacent right side is fetched into the memory region 1420 within the block buffer.

The encircled addresses in the drawing represent pixel data while the dotted circles represent pixel data not to be drawn, the solid circles represent pixel data to be drawn and the hatched circles represent pixel data already drawn.

When drawing a triangle, as illustrated in FIG. 1, at first the pixel data X00 and X01 are generated so that the drawing operation for this first row is completed, subsequently the pixel data X05, X06 and X07 on the second row are generated.

According to the usual raster development the pixel data X14 is generated, next however this pixel data belongs to the block 2120, and so there is no guarantee that the pixel data will have been already fetched into the memory region 1420.

Therefore, according to the present invention, the generation of the pixel data X14 is temporarily interrupted and the drawing operation moves to the processing of the pixel data X09 and which can be generated right now. The drawing illustrates a condition wherein the pixel data X0a have been drawn following the above processing, and the drawing of this row is also interrupted before generating the pixel data X18, and so the drawing operation moves to the processing of the pixel data X0e on the subsequent row.

Since a copy of the block 2110 is produced in the memory region 1410 as explained above, all of the pixel data to be generated for that block are generated.

When the pixel data which can be generated are exhausted from the memory region 1410 storing a copy of the block 2110, then the drawing operation moves to the adjacent block 2120. At this moment, a copy of the block 2120 is already fetched into the memory region 1420 and the drawing of the pixel data X14 of which drawing which was interrupted previously, is executed.

At the same time, the content of the memory region 1410, which has stored the copy of the block 2110 of, which processing has been completed, is begun to write back thereto.

With regard to the memory region 1420 in which a copy of the block 2120 is stored, after generation of the pixel data X14, the processing of the second row is completed, then the processing of pixel data which can be generated, beginning with the pixel data X18 of which processing has been previously interrupted, is restarted.

In the like manner, pixel data X18–X1f, which can be generated for the memory region 1420, are generated.

During the above processing, in the same manner as above a copy of the block 2130 is stored in a proper area in the block buffer 1400.

When there are two memory areas in the block buffer 1400, the above proper area corresponds to the memory region 1410 to which the writing back processing is already completed.

As a result, since the block 2110 is only once read and once written, the memory date transfer amount can be understood to be limited to a minimum level.

Figure 2:
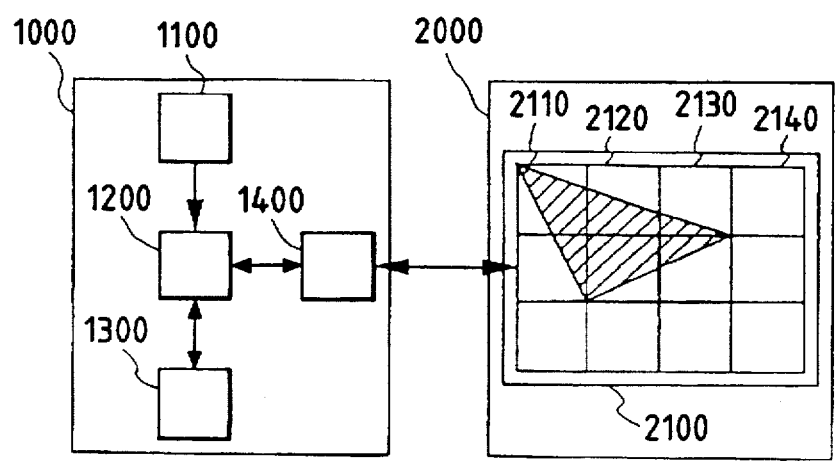
FIG. 2 is a general block diagram of a drawing device according to the present invention.

FIG. 2 shows an example of a drawing device according to the present invention in a general block diagram form.

The drawing region 2100 is contained in a memory device 2000 and the block buffer 1400 is contained in a pixel data generation and processing device 1000. The pixel data generation and processing device 1000 also incorporates a command buffer 1100, in which commands indicating drawings are stored, a pixel data processing unit 1200, which generates pixel data for the block buffer 1400, and a drawing status register 1300, which holds the status of respective blocks and respective rows.

A drawing status control method for the respective rows will be explained with reference to FIG. 3 and FIG. 4.

Figures 3, 4:
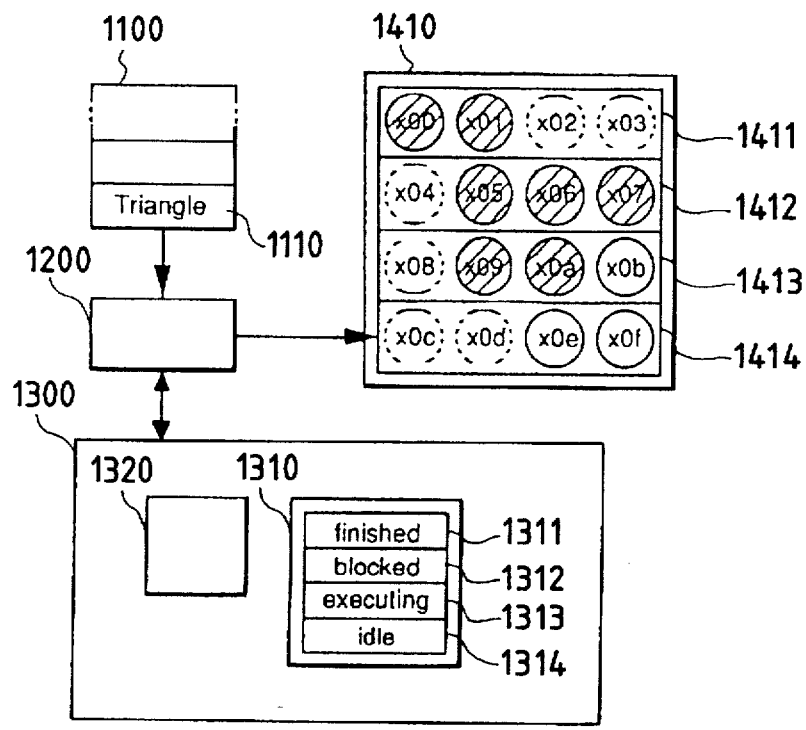
FIG. 3 is a diagram illustrating a status control method concerning respective pixel rows.
FIG. 4 is a diagram illustrating the content of a register indicating status of the respective pixel rows.

FIG. 3 illustrates in more detail the same status as illustrated in FIG. 1.

A drawing of a triangle is herein explained.

The command buffer 1100, store a triangle drawing command 1110 which instructs that a triangle be drawn, is now executing that command.

The pixel data processing unit 1200 breaks down the command into drawing instructions for the respective rows and acts on the memory region 1410 within the block buffer 1400. The status register 1310 illustrated in the drawing indicates that a status 1311 corresponding to a first row 1411 in the memory region 1410 within the block buffer 1400 shows that the processing for the instant row has been complete.

Similarly, a status 1312 corresponding to the second row 1412 in the memory region 1410 indicates that the processing of the instant row is in an interrupted status because the data is located across a block boundary. A status 1313 for the third row 1413 in the memory region 1410 indicates that the processing for the instant row is now being executed and a status 1314 for the fourth row 1414 in the memory region 1410 indicates that the processing for the instant row is not started and, even the as to whether or not the processing therefor is to be started has not been made. The status 1314 for the fourth row 1414 in the memory region 1410 is shifted to an execution waiting status when an analysis result of the triangle drawing command 1110 indicates that the processing of the instant row is to be performed.

The drawing status register 1300 further includes a register 1320, which holds a status common to the blocks or the triangles in contrast to the register 1310 which store data representing the status of the respective rows.

FIG. 4 shows an example of status data for explaining the content of these registers. As items of the register 1310, current drawing position (X, Y), current depth information (Z), current color (R, G, B) and current drawing status (Flag) are recorded. As the drawing status data five kinds of indication, completed, interrupted, under execution, execution waiting and undecided are available. As the contents for the register 1320, values (Xs, Ys, Yz, Rs, Gs, Bs, delta-Y) for obtaining starting point information for the respective rows within a triangle and varied components of pixel data units for the respective elements within the triangle are recorded.

In such a drawing method which performed for every block unit, drawing operation which starts on the left most block can not move to the drawing processing of the subsequent block until the processing of the left side block is completed.

If starting points of the respective rows are shifted leftward all together by row units and the respective rows go out beyond the left side edge of the block, at that very moment, a further left side blocks has to be read and processing has to be started from the further left side block.

An example of countermeasures for the above problem will now be explained.

In the present invention, the above problem is resolved in such a manner that when developing the triangle drawing command 1110 into drawing commands for the respective rows, the processing order of the pixel data is specified.

Figure 5:
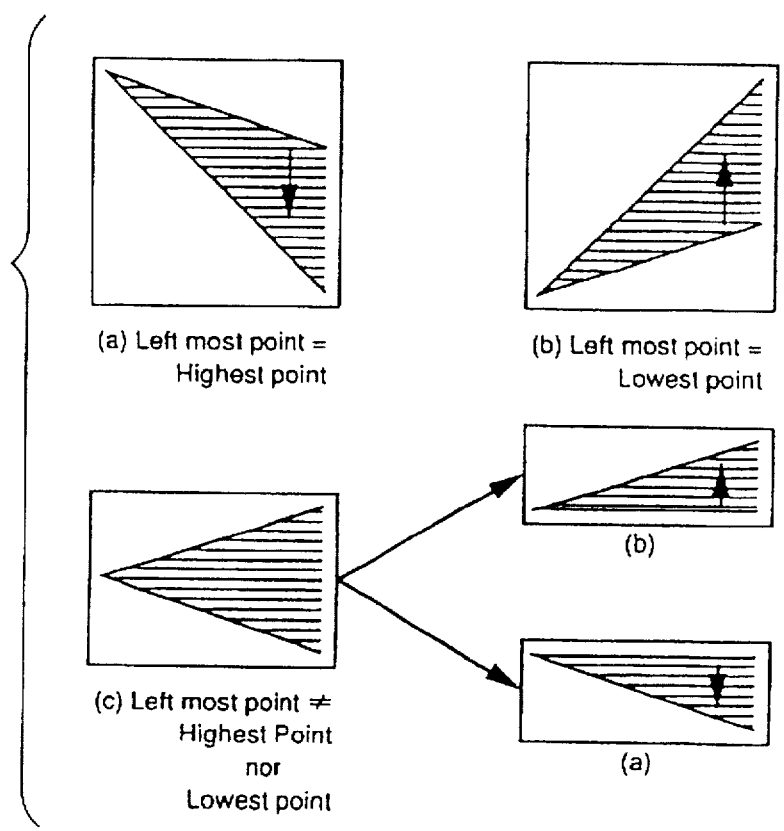
FIG. 5 is a diagram for explaining conditions for determining a drawing direction.

FIG. 5 shows the sequence thereof.

Case (a) illustrates an example wherein the left most point is also the upper most point. In this case, if drawing is performed from the top to the bottom, no starting points for the respective rows go beyond the left edges of the respective blocks. The same is true when the upper side of the triangle extends horizontally.

Case (b) illustrates an example wherein the left most point is also the lower most point. In this case contrary to the case (a) if the drawing operation is performed from the bottom to the top, no starting points for the respective rows go beyond the left edges of the respective blocks. The same is true when the lower side of the triangle extends horizontally.

Case (c) illustrates an example other than case (a) and case (b). In this example when the triangle is divided into upper and lower triangles by a horizontal line passing through the left most point the result is two triangles similar to case (a) and case (b). Since the divided graphics are also triangles, drawing thereof is also possible by making use of the ordinary triangle drawing algorithm.

Figure 6:
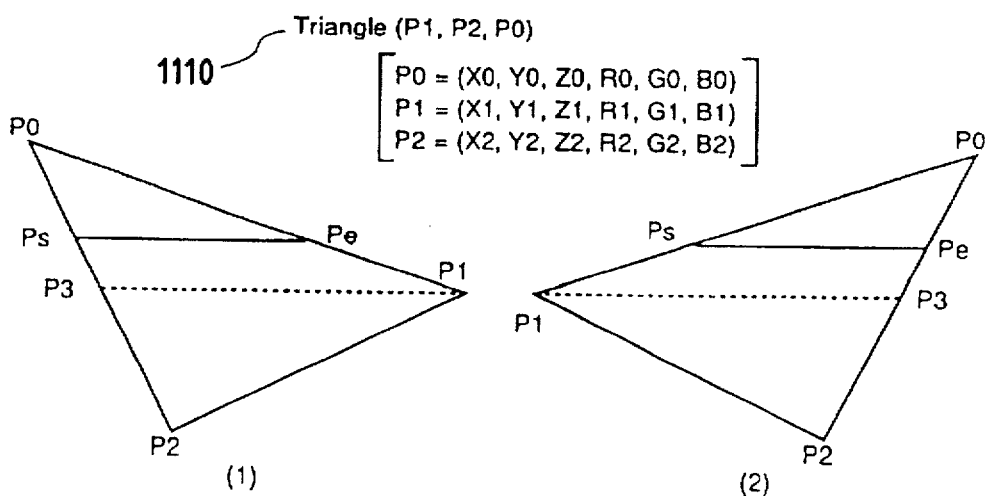
FIG. 6 is a diagram illustrating a specific example of a manner of dividing a triangle.

FIG. 6 is an explanatory diagram wherein the triangle dividing method in FIG. 5 is further generalized.

The triangle drawing command 1110 instructs to draw a triangle having vertexes P0, P1 and P2. Wherein P0, P1 and P2 are constituted by coordinate information and color information of the respective vertexes.

Drawing of the respective rasters for coloring-up or darkening a triangle is executed by giving the starting point Ps and the ending point Pe. In this instance in both of the cases of FIG. 6 (1) and FIG. 6 (2) the method of generating Ps or Pe is varied depending on the upside or downside direction from P1. Accordingly, the triangle is divided into up and down portions with reference to P1.

If the above measure is used, the condition explained in connection with FIG. 5 (c) is automatically eliminated. The coordinate of the vertex P3 newly generated by the division is determined based on the equation indicated in FIG. 6.

Figure 7:
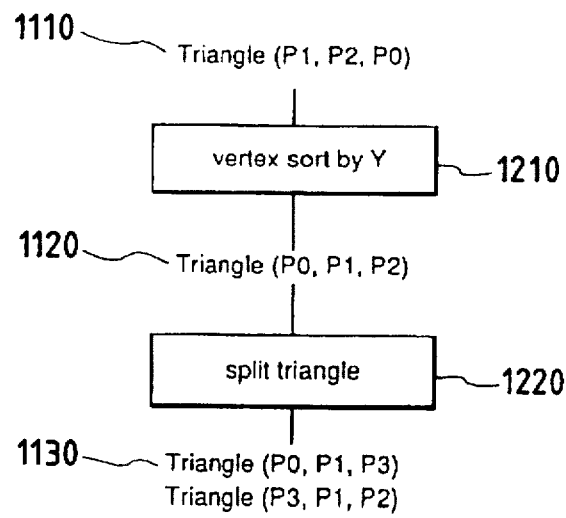
FIG. 7 is a diagram illustrating an algorithm for dividing a triangle

FIG. 7 is a flowchart for explaining how the triangle drawing command 1110 is divided. The respective vertexes are rearranged in the Y direction via a sorter 1210 and are converted into a command 1120. The command 1120 is converted by a triangle divider 1220 into two triangle drawing commands 1130. During the conversion only when there exists a vertex in this instance P1 which is neither an upper most point nor lower most point a new vertex P3 be generated and the triangle be divided.

Figure 8:
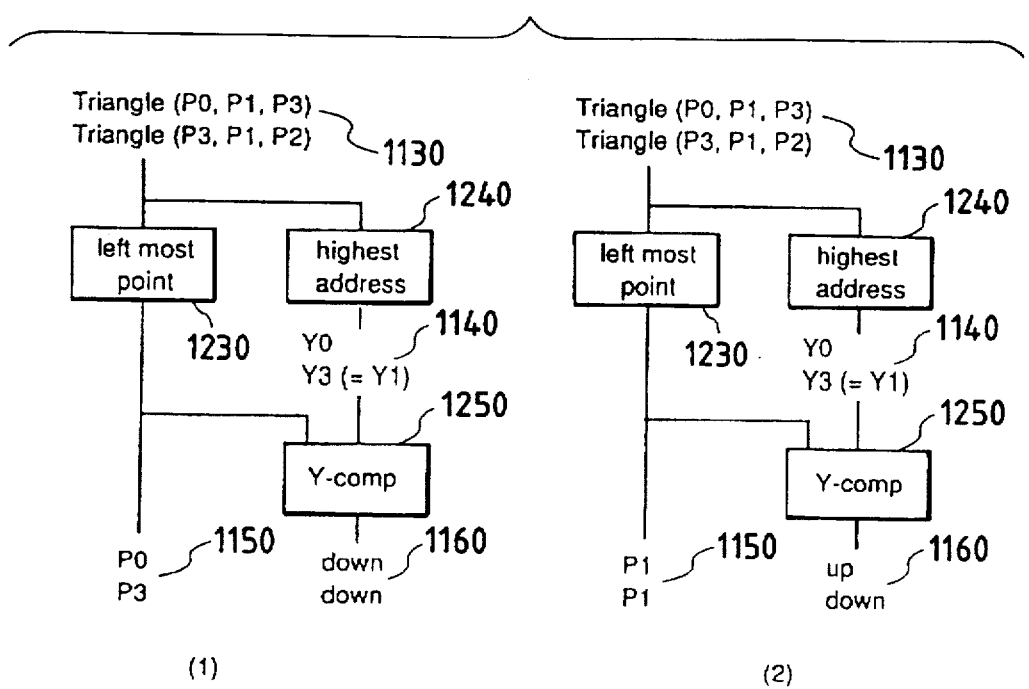
FIG. 8 is a diagram illustrating an algorithm for determining drawing direction.

FIG. 8 shows a method of determining a drawing starting point and drawing direction for a divided triangle drawing command 1130. A drawing starting point 1150 is determined by a left most point detector 1230, and in parallel therewith Y coordinate 1140 of the upper most point of the triangle is also determined.

The Y coordinate 1140 of the upper most point of the triangle and the previously determined Y coordinate of the drawing starting point 1150 are compared in a comparator 1250. The resultant drawing direction 1160 is downward when the Y coordinate 1140 of the upper most point of the triangle and the Y coordinate of the drawing starting point 1150 are equal, and is upward when the both Y coordinates are not equal.

Figure 9:
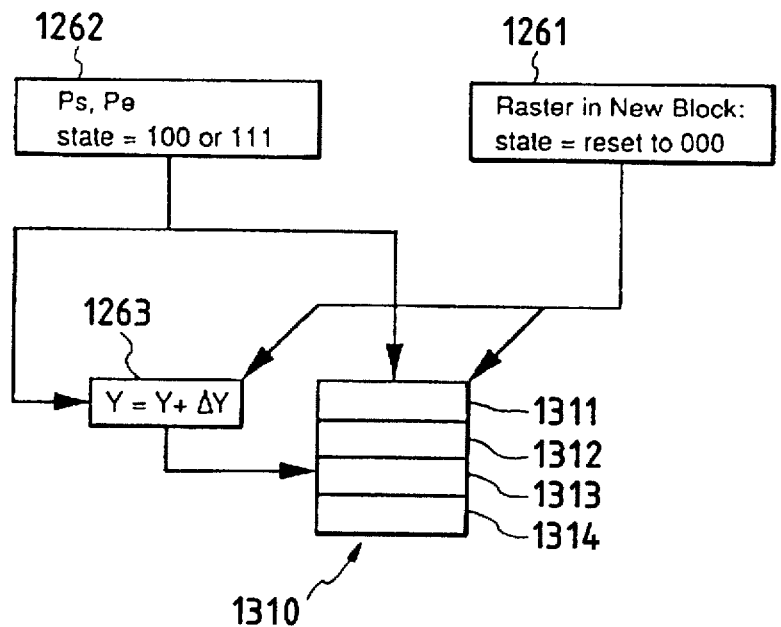
FIG. 9 is a diagram illustrating an initializing method for a status register.

FIG. 9 shows an initializing method for the register 1310 representing a drawing status within the blocks. The initialization of the register 1310 is performed when the first point of the triangle is to be drawn or the first point for a plurality of row sets covered by the relevant block is to be drawn.

At this moment, an initializer 1261 resets the Y coordinate 1263 within the block and the register 1310 so that all of the flags in the register 1310 indicate a non-decided status.

Subsequently a drawing of the triangle is started, in which instance a raster operation generator 1262 sets starting points Ps and ending points Pe for the respective rows. The row address is renewed by a counter 1263 every time one row is set. A waiting status is set for the status flags. At the time when the raster operation generator 1262 completes its operation, there still remain rows in a non-decided status, and so the rows are shifted into a completion status.

Figure 10:
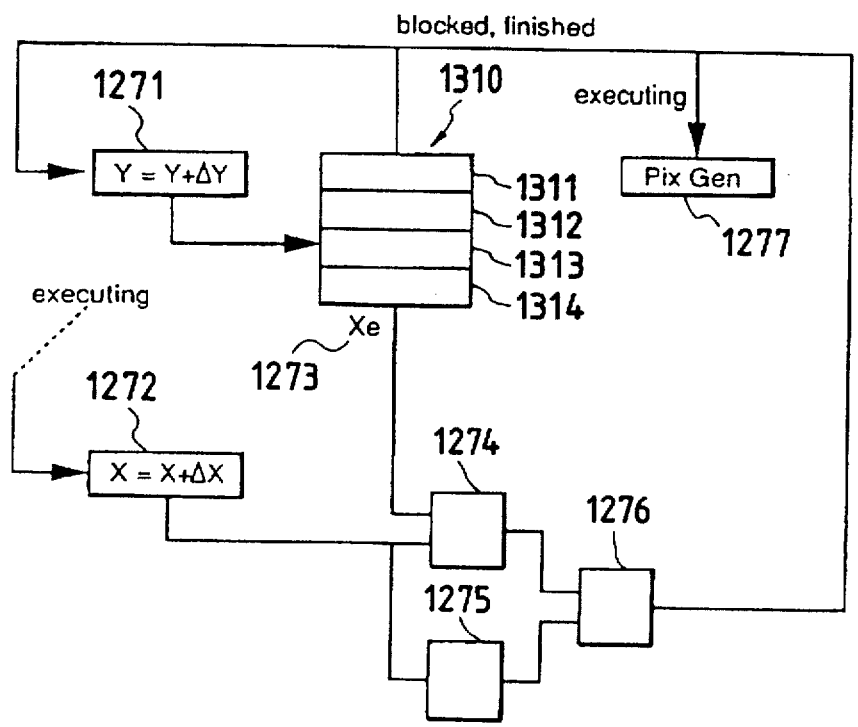
FIG. 10 is a diagram illustrating a setting method for a status register.

FIG. 10 shows a scheme for, performing control of drawing status.

A counter 1271 shows a row currently under processing. The counter 1271 is either incremented or decremented according to the drawing direction after completion of the row processing. From the register 1313 corresponding to the row currently under execution the drawing completion coordinate Xe 1273 is read and is compared with the pixel data coordinate 1272 currently under drawing processing through the comparator 1274. When the currently pixel data coordinate 1272 is equal to the drawing completion coordinate Xe 1273, the drawing processing for the instant row is terminated. In the present invention, in addition to the comparator a block boundary judging unit 1275 is included through which it is judged whether the pixel data coordinate 1272, is on a boundary between blocks.

In the present embodiment, since the block boundary addresses are X03, X07, X06 and X0f, it is simply enough to judge whether the two lower most digits of the addresses are "1". The outputs from the comparator 1274 and the block boundary judging unit 1275 are input to the status generator 1276 to control the subsequent executing condition.

When there exist subsequent pixel data in the block and the execution thereof is possible, the processing of the pixel data generator 1277 is continued and the lateral direction coordinate 1272 is also renewed. When the subsequent pixel data is outside the block or the execution thereof has been completed, this data is set in the register 1313, the row counter 1271 is renewed and the process moves to the subsequent row.

An efficiency enhancement of the block fetching operation will be explained with reference to FIG. 11 through FIG. 14.

Figure 11:
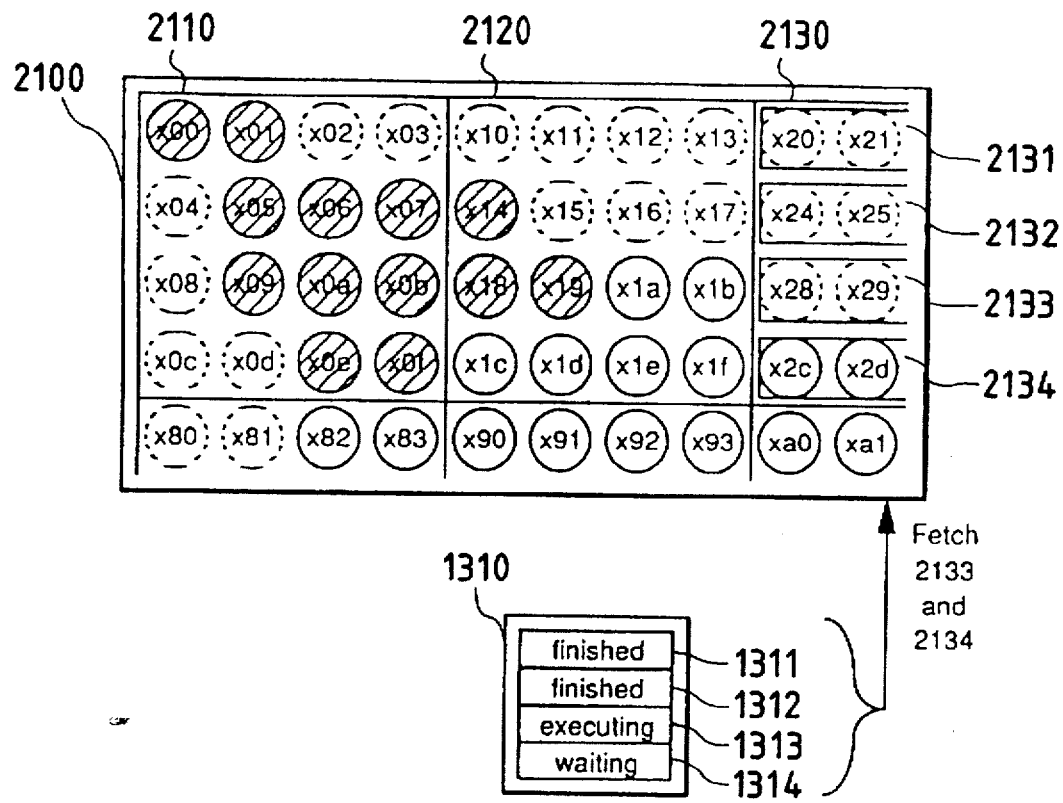
FIG. 11 is a diagram illustrating a fetching method concerning respective rows in a right block.

FIG. 11 illustrates a status wherein the drawing process advances further than that in FIG. 1 and the processing of the block 2120 is now being executed. At the moment when the processing of the block 2120 starts the content of the block 2110, of which drawing has been completed, is written back.

It is assumed that the drawing illustrates the status at the moment when the writing back is completed.

The first row 1311 of the triangle is already in the completed status, when the processing of the block 2110 is completed. The second row 1312 just reached the completed status in the course of processing of the block 2120 now under execution. The third row 1313 is now under execution and the fourth row is in the status of execution waiting. In this instance, since the rows in the adjacent right block 2130 containing pixel data to be drawn are only in the third and fourth rows, these rows alone are prefetched.

Figure 12:
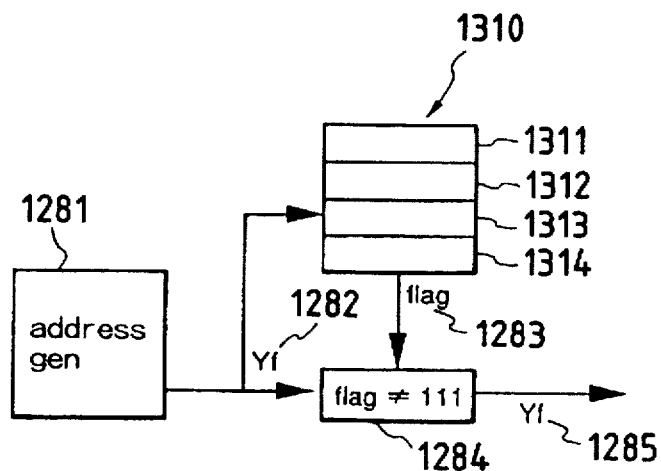
FIG. 12 is a diagram illustrating a fetch address controlling method for the right block.

FIG. 12 shows a method of executing the above processing. Address 1282 corresponding to the block 2130 is produced by an address generator 1281. At this moment a status flag 1283 corresponding to the register 1310 is read and input into a comparator 1284. The comparator 1284 judges whether or not the status flag 1283 indicates the completion status and, only when the status flag 1283 indicates non-completion status, sends out a fetch address 1285.

Figure 13:
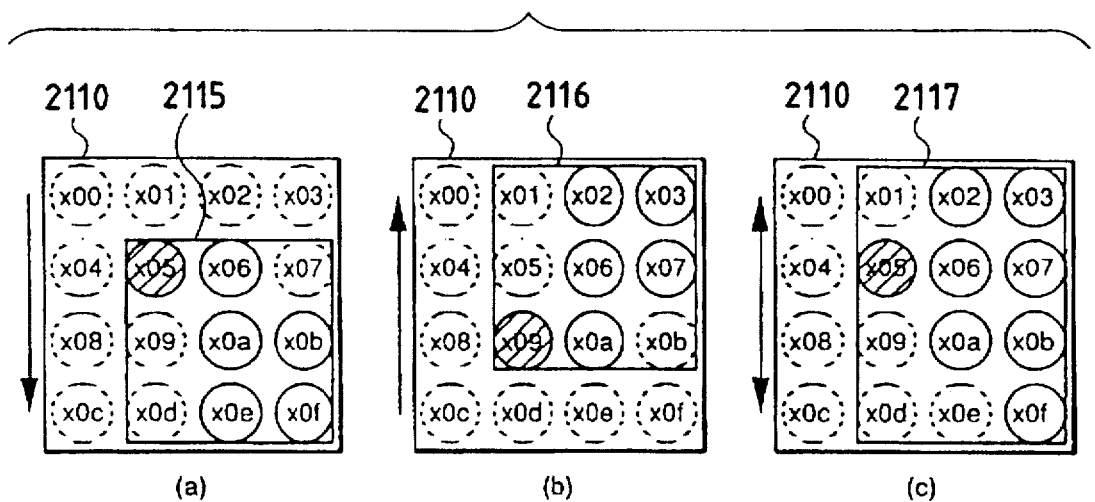
FIG. 13 is a diagram illustrating a fetching method at the time of drawing start.

FIG. 13 shows an example wherein the block which has been processed immediately before is not one located adjacent left thereof. In this instance, the processing has to be started from fetching of the block itself. The position of the pixel data to be generated at first and the drawing direction as explained in connection with FIG. 5 are known beforehand.

FIG. 13(a) shows a case in which the position of the pixel data to be generated at first is X05, the drawing direction is downward and only the portion indicated by 2115 is prefetched.

FIG. 13(b) shows another case in which the position of the pixel data to be generated at first is X09, the drawing direction is upward and only the portion indicated by 2116 is prefetched.

FIG. 13(c) shows still another case in which the position of the pixel data to be generated at first is X05, the drawing direction is both upward and downward and only the portion indicated by 2117 is prefetched.

Figure 14:
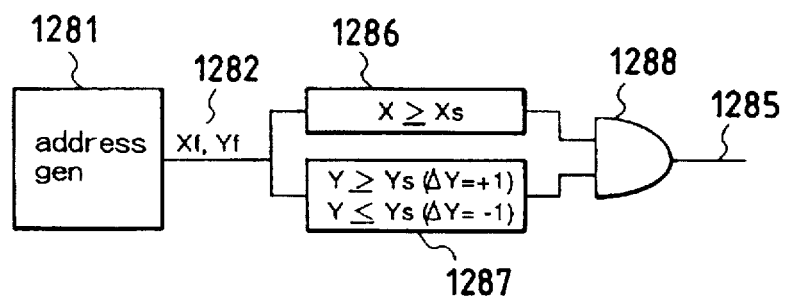
FIG. 14 is a diagram illustrating a fetch address controlling method at the time of drawing start.

FIG. 14 shows a method of performing processing for the above cases. The address 1282 for the block is produced by the address generator 1281 in the same manner as explained in connection with FIG. 12. The X coordinate in the address 1282 is compared in a comparator 1286 the Y coordinate in the address 1282 is compared in a comparator 1287, and these comparison results are collected in an AND element 1288 from which an address 1285 to be fetched is sent out.

Figure 15:
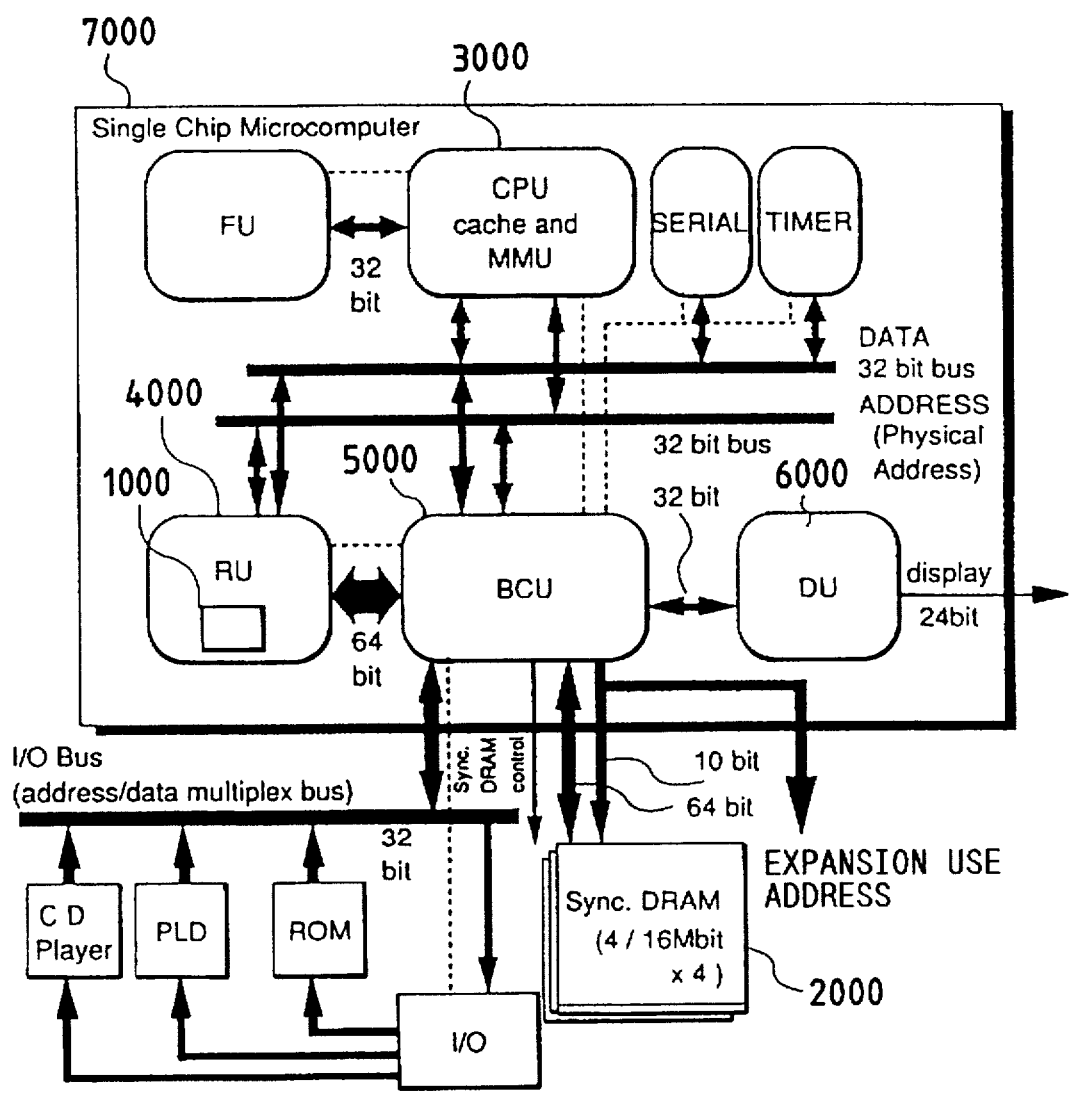
FIG. 15 is a general system diagram of the present invention when applied to a graphics microprocessor.

FIG. 15 shows a block diagram of the present invention as applied to a graphics microprocessor. A single chip microprocessor 7000 incorporates therein a central processing unit 3000, a rasterize unit 4000, a bus control unit 5000 and a display unit 6000. A memory region 2000 is connected via a dedicated bus with the bus control unit 5000 in the single chip microprocessor 7000, and is constituted to permit data exchange with the central processing unit 3000, the rasterize unit 4000 and the display unit 6000 via the bus control unit 5000. The display unit 6000 reads data from the drawing region 2100 in the memory region 2000 and produces a signal for a display device. The rasterize unit 4000 contains the pixel data processing device 1000 according to the present invention. In the central processing unit 3000, an application program is executed and the resultant drawing command 1110 is transferred directly to the rasterize unit 4000 without routing by the bus control unit 5000. During the drawing operation, the rasterize unit 4000 accesses the memory device 2000 via the bus control unit 5000.

Figure 16:
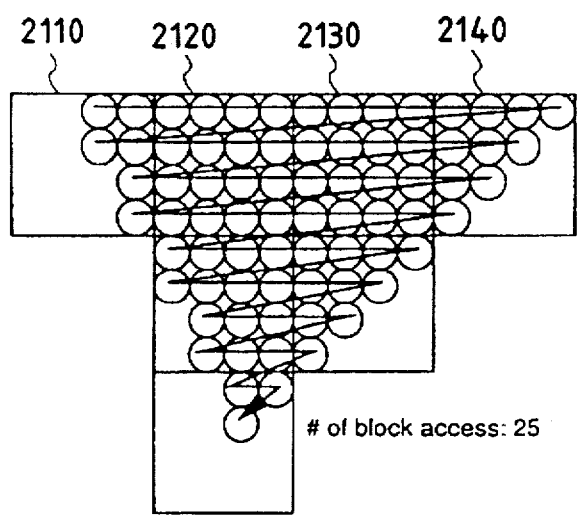
FIG. 16 is a diagram illustrating a conventional drawing method.

FIG. 16 shows a drawing sequence which occurs when the present invention is not used. Since the drawing is performed for every row unit regardless of the boundaries, at most 25 block accesses are generated. Since every time 9 block access is generated, the lower address of the memory is modified, the performance of the system is reduced the traffic to the memory is increased.

Figure 17:
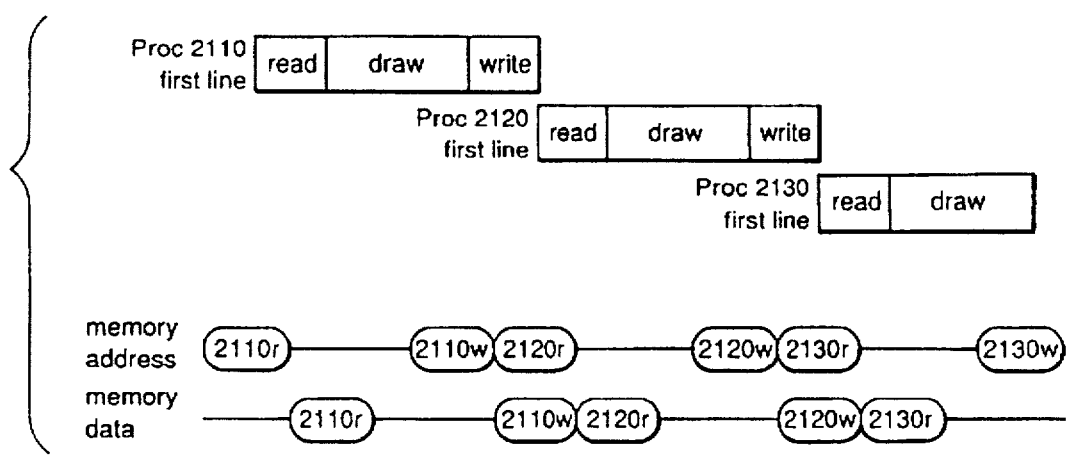
FIG. 17 is a time chart for drawing by the conventional method.

FIG. 17 shows a time chart relating the drawing operation performed in accordance with the above explained procedure. Address switching occurs 4 times merely when the first rows of the blocks 2110, 2120, 2130 and 2140 are drawn, and further, since the block reading is executed on a demand basic the written content held in a block to be read-in has to be written back before performing the read-in to the block.

Figure 18:
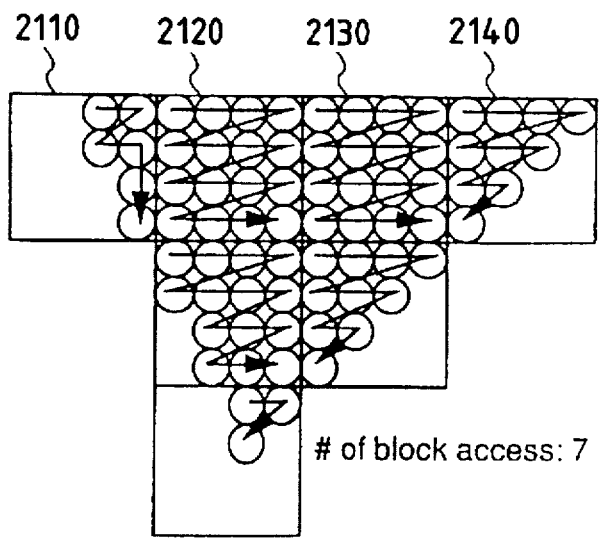
FIG. 18 is a diagram illustrating a drawing method according to the present invention.

FIG. 18 shows the drawing sequence according to the present invention. The pixel data in the respective blocks are generated while giving a priority to the pixel data in the same block independent of the order of row developement. In this instance, block access required only blocks is 7 times.

Figure 19:
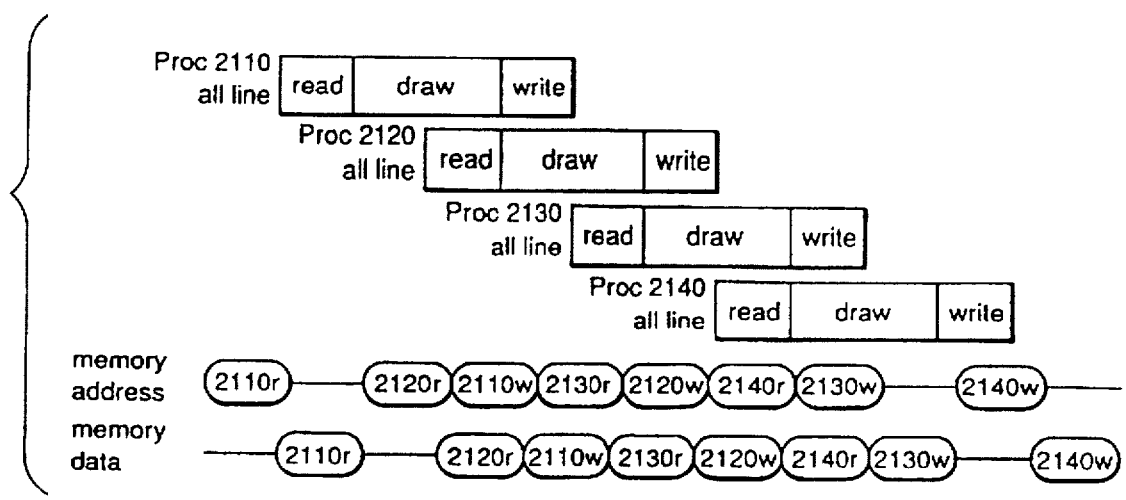
FIG. 19 is a time chart for drawing by the method of the present invention.

FIG. 19 shows a time chart according to the present invention. The block switching for drawing the respective rows in the blocks 2110, 2120, 2130 and 2140 is required only 4 times. Further, because of the prefetching control, the block can be read-in before writing-back the written content of the block, so that the pipe line processing as shown in FIG. 19 can be realized.

Through execution in advance of the generation of executable pixel data for, once fetched block, regardless of the raster developement order of the respective rows, reading-of the relevant block in a plurality of times is prevented and the throughput is improved.

Figures 20, 21:
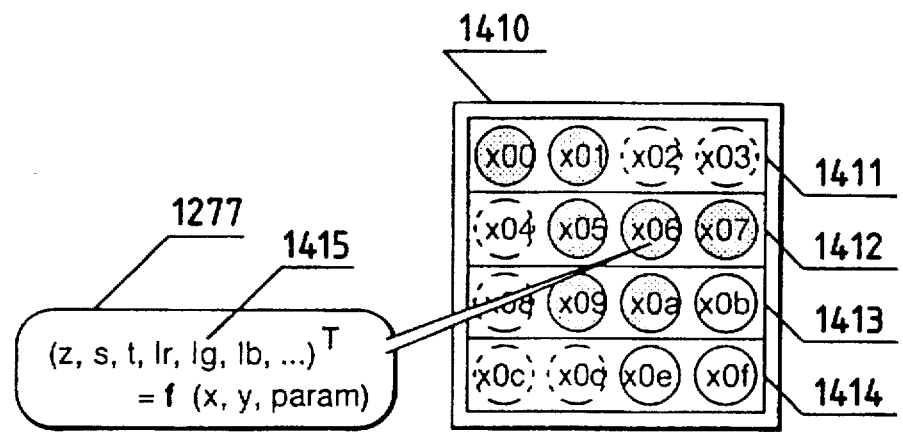
FIG. 20 is a diagram illustrating a method of calculating pixel attributes.
FIG. 21 is a diagram illustrating the content of a control register.

FIG. 20 through FIG. 23 are diagrams for explaining another embodiment based on another pixel generating sequence. FIG. 20 illustrates a calculation method for determining attributes of a pixel to be generated. The attributes 1415 of a pixel includes depth information Z, texture coordinates s, t pixel brightness information of Ir, Ig, Ib and the like, and based on these values, a final pixel value is determined. The attributes of a pixel can be uniquely determined as a function of the coordinate value x, y and a constant parameter param within a plane of the triangle. The present embodiment is based on the drawing device having the pixel generating unit 1277.

FIG. 21 shows a content of the register which stores control information for processings. A block 1320 shows the processing status of every one of blocks. param indicates a coefficient group for linearly-calculating many kinds of attribute values by making use of x and y the current block is an address of the, block now under processing, pivot block is a register which stores a start block address for the, block row now under processing, direction is an advancing direction to the right or left during processing for every one of the blocks, and the next pivot indicates a block address to be pivoted during the processing of the subsequent row.

The status register 1310 in connection with the block internal status is constituted by individual status registers 1311 through 1314 for the respective rows in the block. The contents of the individual status registers 1311 through 1314 include left end pixel address Xs, right end pixel address Xe, left direction processing status flag Lflag and right direction processing status flag Rflag for the respective rows. Xs and Xe are determined by side address calculation of the plane, and the left and right direction processing status flags are determined in the same manner as in the embodiment explained above.

Figure 22:
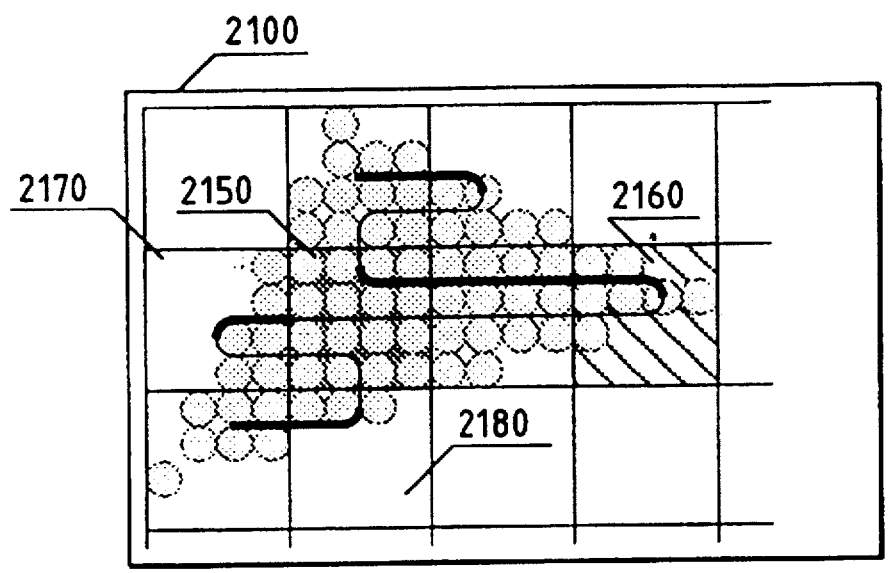
FIG. 22 is a diagram for explaining in detail a pixel generating sequence.

The pixel generation sequence will be explained in detail with reference to FIG. 22. FIG. 22 shows a way of drawing a triangle. The pixels are successively processed from the upside. When there exist a plurality of upper most pixels, the drawing is started from the left, most pixel. The drawing range [Xs, Xe] of the respective rows is determined based on the basic of the inclination of the respective sides of the triangle. A block 2150 is a pivot block as will be explained later. Placing this block 2150 at the center, the drawing is developed in the right and left directions. Immediately after completing the drawing of the pixels within the block 2150 with priority, the respective rows in the right and left blocks are placed in a blocked condition. Subsequently, the adjacent right side block is processed, and so the status flag at the right side is changed. Namely when the fourth row is in the processing finished status the other rows are in the processing blocked status. When the process further advances in the right direction, the process reaches the right most block 2160. After finishing the processing of this block, all of the rows are placed in to the finished status. At this stage, the processing direction is switched to the left direction. This is because the status flags at the left side still remain in the blocked condition. The processing is started from the block on the left side of the pivot block. When the processing the left direction is finished, then the processing moves to a pivot block 2180 on the next lower row. This new pivot block is registed beforehand as the next pivot block. This next pivot block 2180 is a block which is located immediately below the block under the processing of the immediately adjacent upper block row contains pixels to be drawn, and appears first, last or is determined via a certain algorithm.

In the present embodiment the first one is used. The processing successively advances downward and when no next pivot block can be determined, the processing is terminated.

Figure 23:
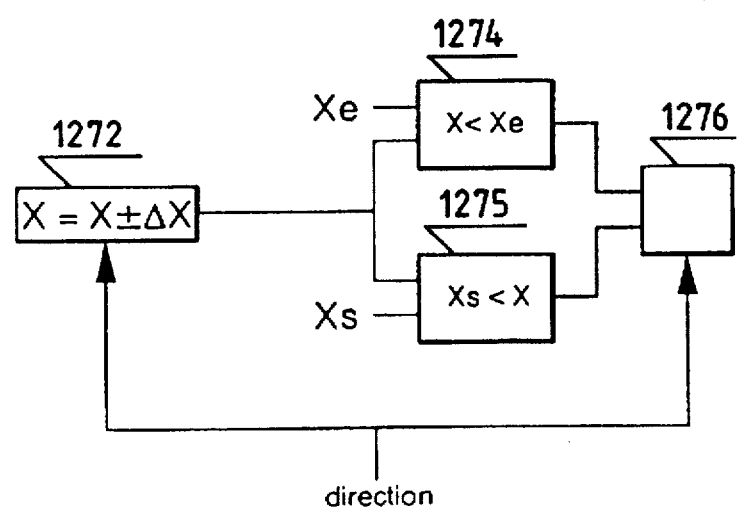
FIG. 23 is a diagram for explaining a logic arrangement for determining a processing status.

FIG. 23 is a drawing for briefly explaining the logic of determining the processing status for the respective rows. A block 1272 represent a means for moving pixels the in lateral direction and in which the selection between addition and subtraction is determined according to the advancing direction of the processing. Further, in block 1274 or 1275 the range is checked. In block 1276, the selection of which block check is to be reflected on the status is determined according to the advancing direction of the processing.

Figure 24:
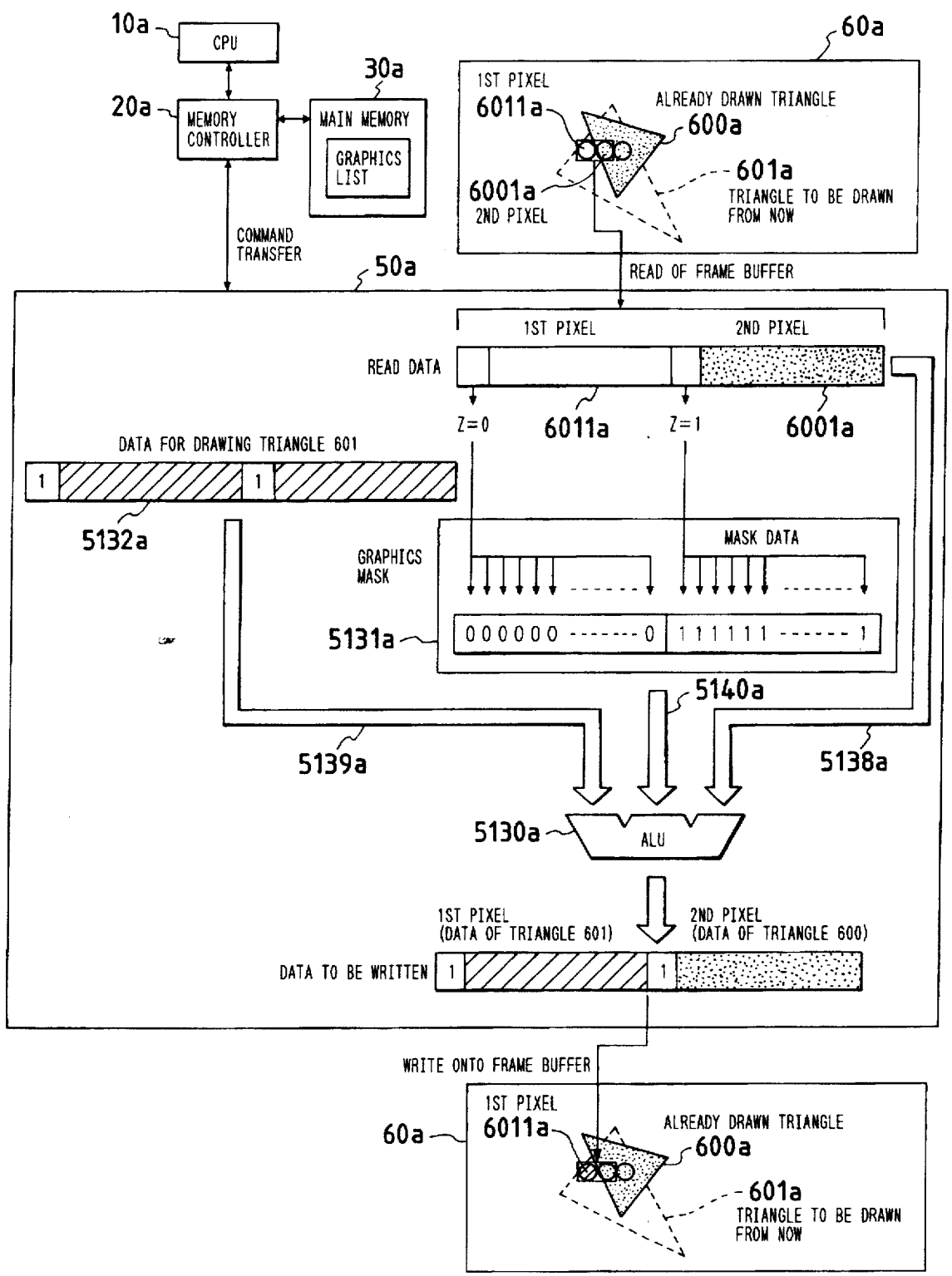
FIG. 24 is a diagram for explaining hidden surface processing by making use of Z bits.
Figure 25:
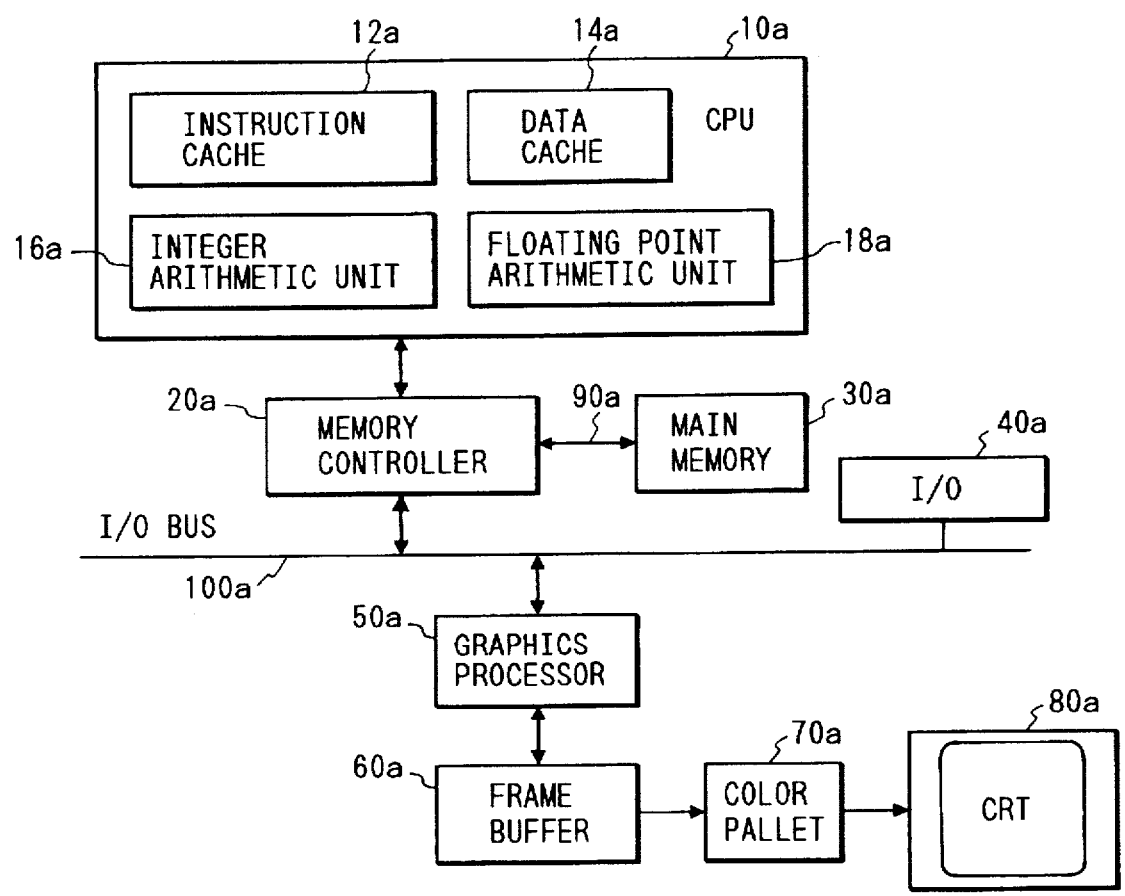
FIG. 25 is a general block diagram of a three dimensional graphics display device according to the present invention.

A further embodiment according to the present invention will be explained with reference to FIG. 24 through FIG. 42. FIG. 24 is a block diagram of a graphics drawing device, and FIG. 25 is a block diagram of a three dimensional graphics display device using the graphics drawing device shown in FIG. 24. In FIG. 24 and FIG. 25, the graphics drawing device is provided with and a CPU 10a, a memory controller 20a, a main memory 30a, an I/O interface 40a, a graphics processor 50a and a frame buffer 60a, and the three, dimensional graphics display device is provided with, in addition to the elements in the graphics drawing device, a color pallet 70a and a CRT 80a. The memory controller 20a, the I/O interface 40a and the graphics processor 50a are respectively connected via an I/O bus 100a.

The CPU 10a is provided with an instruction cache 12a, a data cache 14a, an integer arithmetic unit 16a and a floating point arithmetic unit 18a, is and constituted to be accessible to the main memory 30a for fetching instructions and data via the memory controller 20a and a dedicated bus 90a. In the main memory 30a, a graphics list containing image information of pixel groups of graphics to be displayed, corresponding to graphics of a plurality of polygons having different positions in the depth direction, is stored. Namely, the main memory 30a is constituted as a graphics list storage means. In the graphics list Z a coordinate value for every graphic is included, the respective graphics are successively sorted in the order from one having the smallest Z value according to the a command from the CPU 10a, and the image information of the respective graphics is transferred according to the sorting order to the graphics processor 50a via the memory controller 20a. Further, the CPU 10a serves as a region judgement means same which judges, based on the image information whether or not the drawing region of a polygon belonging to a sorted graphics list is contained, in a drawing region of a polygon belonging to a graphic having a higher sorting order, and further serves as a deleting means which deletes the graphic judged as contained by the region judgement means from the graphics list. Further, the I/O interface 40a is constituted as an interface, such as for a hard disk and communication.

Figure 26:
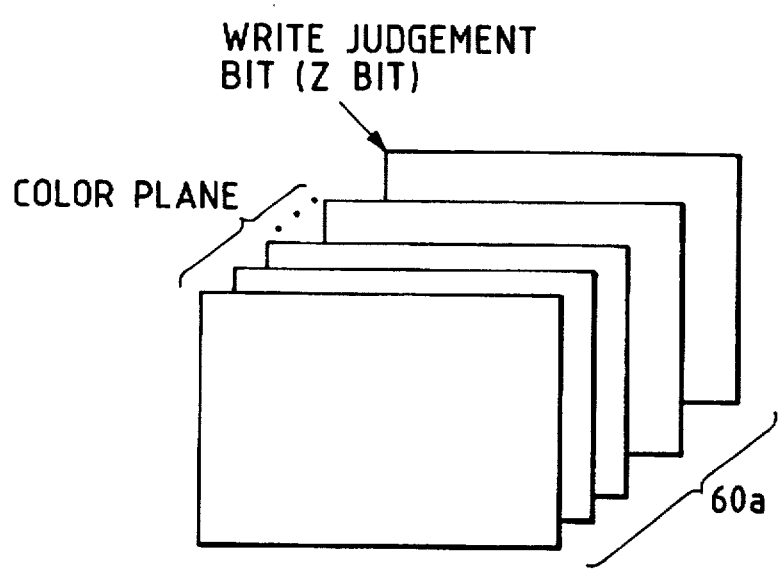
FIG. 26 is a diagram of a frame buffer.
Figure 27:
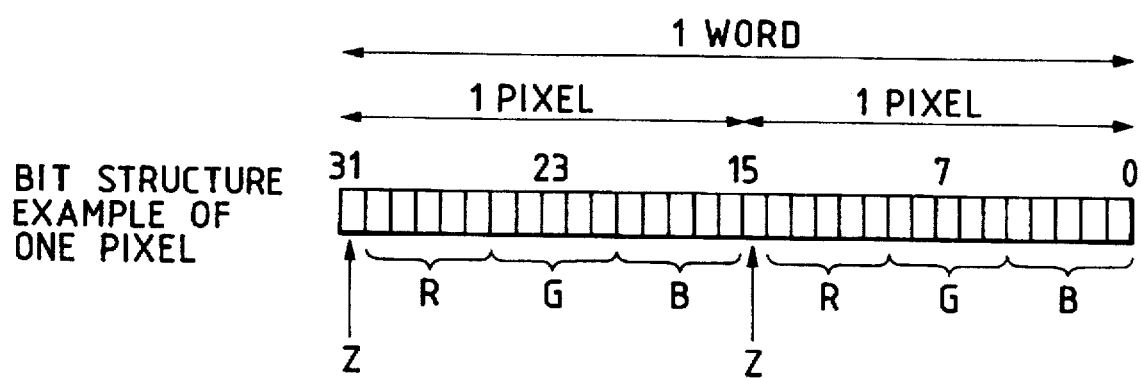
FIG. 27 is a diagram illustrating an example of a bit arrangement when a frame buffer using Z bits is read.

The graphics processor 50a is adapted to receive a command from the CPU 10a and to successively draw the graphics data, based on the image information contained in the graphics list into the frame buffer 60a according to the command. As shown in FIG. 26 and FIG. 27, the frame buffer 60a is provided with a plurality of color planes 62a, each of which is designed to store graphics data of the respective pixels A. 16 bits data storage area is provided for each of the pixels, the data of two pixels are constituted by data of one word and among data each pixel, 14 bits are allotted for color data of R, G and B as color information and 1 bit is allotted for data of Z information. For the Z information, when each of the pixels is already drawn, a flag "1" representing control data is stored and when each of the pixels is not yet drawn "0" is stored. Graphics data (drawing data) drawn in the frame buffer 60a is successively read as display data, and after expanding the display color using the color pallet 70a, transferred to the CRT 80a. Thus a three dimensional image according to the display data is displayed on the screen of the CRT 80a.

When the graphics processor 50a draws graphics data based on the graphics list, a command as shown in FIG. 28 is transferred from the CPU 10a to the graphics processor 50a and a processing according to the command is executed by the graphics processor 50a. A 3D triangle drawing command is a command for graphics having depth, in which graphics data is varied by adding (or subtracting) a varied component of data between adjacent dots to (or from) the data at the drawing start point in accordance with the movement of the drawing coordinate, and the graphics are darkened depending on the depth thereof. The above method follows a method called Gouraud shading.

A 3D straight line copy command is a command which uses straight line data on the frame buffer 60a designated by Addr1 and SX1 as source data and copies the same on a straight line portion designated by Addr2, SX2, SY2. By generating this command a plurality of times while staggering Addr1, and Addr2 polygon drawing with texture mapping can be commanded. The texture mapping is a drawing in which image data is applied on the surface of the graphics so that a real image can be displayed.

A 3D straight line drawing command is used when a three dimensional graphics display of a wire frame is generated which show is adapted to display only the outline of the graphics.

2D straight line drawing command is a command for drawing a straight line when a two dimensional graphic is displayed.

A 2D straight line copy command is a command to copy via straight line source data designated by Addr1 on a place designated by Addr2. By generating this command a plurality of times while gradually staggering Addr1 and Addr2, expansion, reduction and rotation of two dimensional image data can be commanded.

The designation BitBLT is an abbreviation of Bit Block Transfer, and this command is a command to copy at high speed two dimensional image data on another area.

Figure 29:
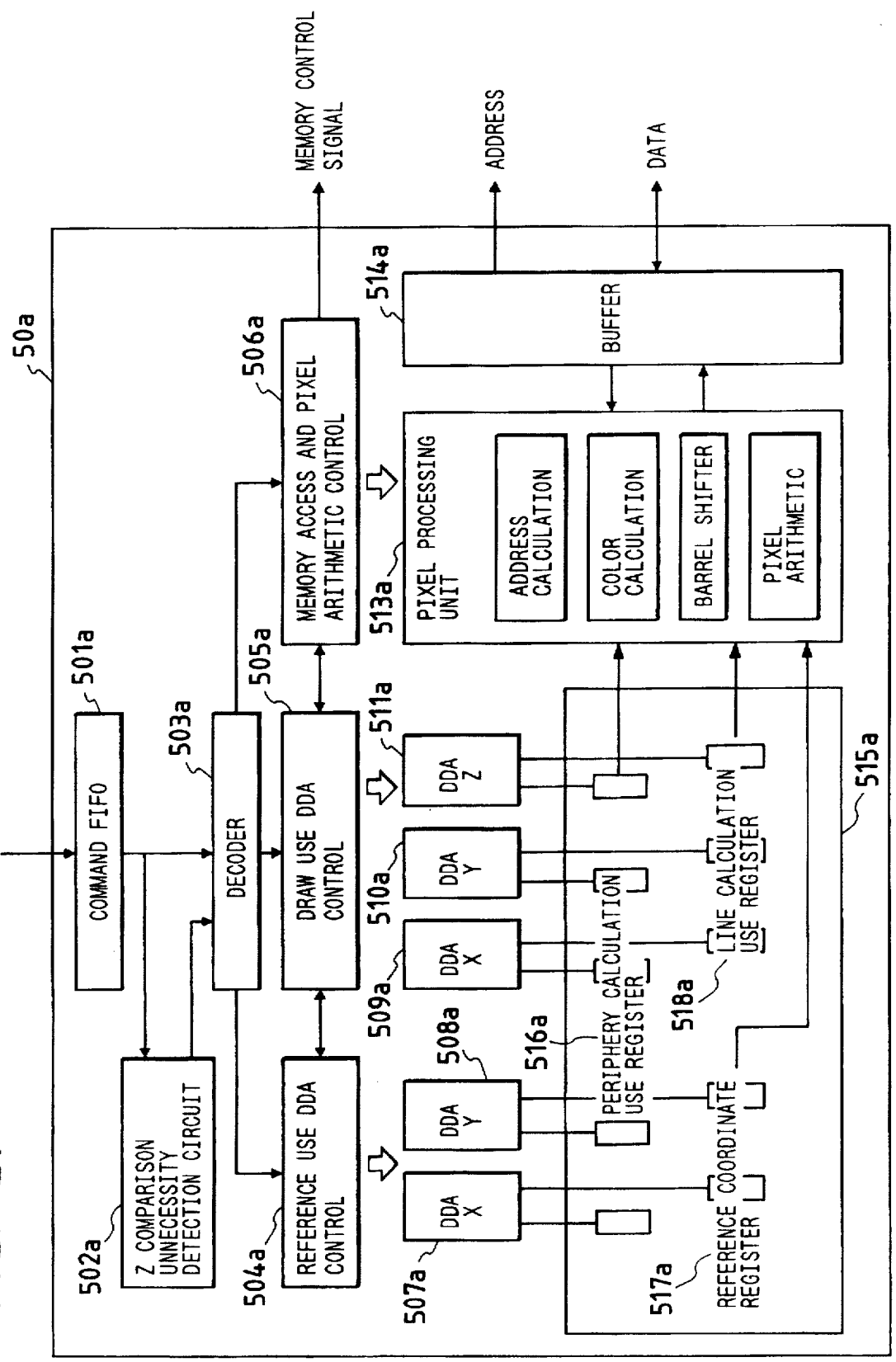
FIG. 29 is a block diagram of the graphics processor.

As shown in FIG. 29, the graphics processor 50a is specifically provided with and constituted by a command FIFO (First In First Out) 501a, a Z comparison unnecessity detection circuit 502a, a decoder 503a, a reference use DDA (Digital Differential Analizer) control unit 505a, a memory access and pixel arithmetic control unit 506a, DDAs 507a, 508a, 509a, 510a and 511a, a pixel processing unit 513a, a buffer 514a and a register unit 515a. The register unit 515a is provided with a plurality of peripheral calculation use registers 516a, reference coordinate registers 517a and straight line calculation use registers 518a. The command FIFO 501a is constituted to temporarily store a command from the CPU 10a, and the temporarily stored command is interpreted by the decoder 503a According to the interpreted command, controls by the respective control units 504a, 505a and 506a are executed. The reference use DDA control unit 504a commands the DDAs 507a and 508a to calculate coordinate values of source data for the 3D straight line copy command, 2D straight line command and BitBLT command and successively stores the coordinate values X, Y of the source data calculated by the DDAs 507a and 508a into the reference coordinate register 517a. The drawing use DDA control unit 505a outputs a calculation command to the DDAs 509a and 511a so as to control calculation of coordinate values for drawing graphics data into the frame buffer 60a and stores the coordinate values X, Y and Z representing the calculation results by the respective DDAs 509a and 511a into the respective registers 516a and 518a. The pixel processing unit 513a is provided with an address calculating unit 520a, a color calculating unit 521a, a barrel shifter unit 522a and a pixel arithmetic unit 523a so as to calculate graphics data to be written into the frame buffer 60a.

Figure 30:
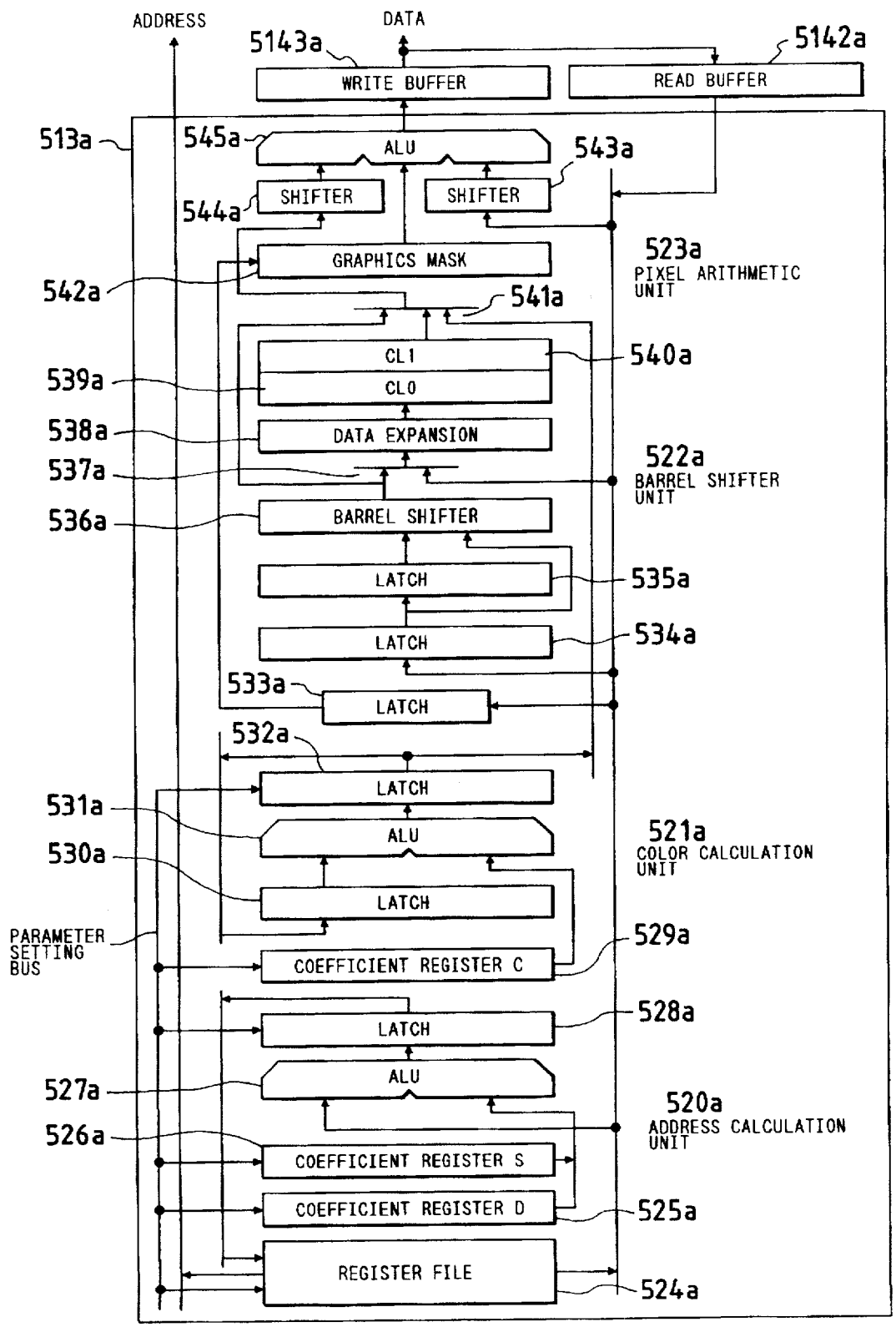
FIG. 30 is a block diagram of a pixel processing unit.

As shown in FIG. 30, the pixel processing unit 513a is provided with and constituted by a register file 524a, a coefficient register D 525a, a coefficient register S 526a, an ALU 527a, a latch 528a, a coefficient register C 529a, a latch 530a, an ALU 531a, latches 532a, 533a, 534a and 535a, a barrel shifter 536a, a gate 537a, a data expanding unit 538a, a CL0 539a, a CL1 540a, a gate 541a, a graphics mask 542a, shifters 543a and 544a and a ALU 545a, so that data from the frame buffer 60a is input via a read buffer 514a and data calculated by the ALU 545a is transferred to the frame buffer 60a via a write buffer 5143a.

Address calculating unit 520a is adapted to calculate a memory address corresponding to the coordinate values calculated by the DDAs 507a–511a. Further, in the coefficient register S 526a, a varied amount of memory address, when the coordinate value of the source address moves by one pixel, is stored and a renewal of the memory address is performed in association with the movement of the coordinate value by the ALU 527a. Still further, in the coefficient register D 525a, a varied amount of memory address when a drawing coordinate value moves by one pixel, is stored and a renewal of the memory address is executed in association with the movement of the coordinate value by the ALU 527a. The memory address calculated by the ALU 527a is, after being latched by the latch 528a, stored in the register file 524a.

The color calculation unit 521a is adapted to successively calculate graphics data to be drawn in response to the 3D triangle drawing command. In the coefficient register C 529a a varied component of data between adjacent pixels is stored and in association with movement of the drawing coordinate drawing, data is calculated by the ALU 531a. In this case, the drawing data is temporarily stored in the latch 532a and then is transferred to the pixel arithmetic unit 523a as well as recursively to the latch 532a, so as to used for the following pixel data calculation. Namely, when color information at a start point is stored in the latch 532a, information px, dpy is transferred from the coefficient register C 529a to the ALU 531a at every movement of one pixel, and in association with the movement of the drawing, coordinate graphics data is calculated by the ALU 531a for the graphics data (drawing data).

The barrel shifter unit 522a is adapted to shift source data for the 3D straight line copy command, the 2D straight line command and Bit BLT command in association with the drawing position. The pixel arithmetic unit 523a is adapted to perform arithmetic operation with the ALU 545a based on the drawing data from the latch 532a and the data at the destination of the drawing. The ALU 545a includes, arithmetic functions of addition, subtraction, AND, OR, EOR and a through mode of drawing data. Namely, when Z value of the data inputted via the read buffer 5142a is not 0, the ALU 545a judges that it is not yet drawn, fetches the data from the gate 541a via the shifter 544a and produces new graphics data together with the data from the graphics mask 542a. On the other hand, when the Z value of the graphics data inputted from the read buffer 514a is "1", the ALU 545a judges that it has been already drawn, fetches the graphics data inputted from the read buffer 514a via the shifter 543a and outputs the graphics data as it is via the write buffer 5143a. Namely, for the bit which is designated for masking, depending on mask information produced by the graphics mask 542a, non-modified original data is outputted without performing an arithmetic operation on the data at the destination of the drawing. For this reason, through production of mask data for the pixel indicated as already drawn by the Z bit, production of new graphics data can be eliminated.

A specific processing which occurs when the 3D triangle drawing command as a graphics drawing command is transferred to the graphics processor 50a will be explained. This command is expressed by the following format, as shown in FIG. 28:

TRIAGL Addr, x1, y1, x2, y2, p, dpx, dpy

TRIAGL=command representing 3D triangle drawing

Addr=memory address at drawing start vertex of triangle x1, y1=relative coordinate values from Addr representing a vertex of triangle x2, y2=relative coordinate values from Addr representing a vertex of triangle p=pixel data at drawing start point dpx=varied component of pixel data when moved in x direction by one pixel dpy=varied component of pixel data when moved in y direction by one pixel When the above command is inputted into the decoder 503a via the command FIFO 501a and the decoder 503a recognizes the command as the 3D triangle drawing command, then a control according to the command is executed. At first, parameters x1, y1, x2 and y2 are set at the peripheral calculation use register 516a. Thereafter, through DDAs 509a and 510a, a coordinate value (e1) on a straight line connecting Addr and (x1, y1) on the triangle and another coordinate value (e2) on a straight line connecting Addr and (x2, y2) on the triangle are successively calculated. Subsequently, in order to draw a straight line parallel with the x axis direction and having the two coordinate values (e1), (e2) at respective ends thereof, the two coordinate values are set in the straight line calculation use register 518a. Then, the respective DDAs 509a and 510a generate coordinate values of a straight line in parallel with the X axis direction. In association with the generation of the coordinate values of the parallel line, the processing of the pixel data is executed in the pixel processing unit 513a.

In the latch 532a in the pixel processing unit 513a, the data of the pixel currently being drawn is stored and in the coefficient register C 529a the parameter dpx is stored. Therefore, when a coordinate value on the parallel line moves by one pixel, the value in the coefficient register C 529a is added to the value in the latch 532a and the data for the following pixel is calculated. Further, in the latch 528a a memory address in the frame buffer 60a corresponding to the coordinate value on the parallel line is stored, every time when the coordinate value is renewed, the value in the coefficient register D 525a is added thereto and the memory address is also renewed. Further, every time pixel data is calculated, through the memory access and the pixel arithmetic control unit 506a, the pixel data at the designation of the drawing is read from the frame buffer 60a according to the address designated by the latch 528a. When the Z bit among the read pixel data is rewritable by "0", the data is subjected to an arithmetic operation with the data in the latch 532a by the ALU 545a and thereafter is drawn into the frame buffer 60a. Through the above processings, the respective pixels on the parallel line can be successively drawn. When one parallel line has been drawn, the coordinate values (e1) and (e2) are moved by one pixel and the same processings are executed to draw another parallel line. When these processings are repeated the drawing of a triangle is completed.

When performing drawing with the graphics processor 50a, since the Z bit judgement can be performed at the same time as the pixel arithmetic operation is being carried out the Z bit judgement time does not appear in the execution time, thereby a high speed processing is realized. Further, by providing the shifters 543a and 544a at the input of the ALU 545a, the amount of data can be halved or doubled.

A specific processing will be explained with reference to FIG. 24 in which, during successive drawing of a graphics list through provision of a 1 bit flag as control data representing whether or not the drawing is already finished for the respective pixels in the frame buffer 60a, overlapping of graphics is checked and drawing of hidden graphics is prevented.

At first, when the CPU 10a successively sorts the graphics groups in the graphics list stored in the main memory 30a based on the depth information, commands for the graphics according to the sorting order are transferred from the CPU 10a to the graphics processor 50a. As an example when a command of one graphics unit (triangle) is inputted, processing according to the command is executed. For example, as shown in FIG. 24, under the condition that a triangle 600a is already drawn in the frame buffer 60a, when a new triangle 601a is to be drawn behind the already drawn triangle 600a, the following processings are performed. Namely, in this case in which the triangle 601a is to be displayed deeper than the triangle 600a, a processing which only draws the part not hidden by the triangle 600a is performed for the triangle 601a. FIG. 24 shows an example in which a first pixel 6011a and a second pixel 6001a of the triangle 601a are to be drawn during drawing of the triangle 601a.

At first, the coordinate values of the respective pixels are determined, based on the respective vertexes of the triangle 601a and color information of the respective pixels is produced. Then, pixel data 513a for the first pixel 6001a is produced. At this time the Z bit for each of the pixels "1" is set. Then, the pixel data 5132a is output to the ALU 545a as pixel data 5139a. Further, pixel data is read-in to the pixel 6011a and the second pixel 6001a of the triangle 601a from the frame buffer 60a via the read buffer 5142a. At this time, since no pixel data has been drawn on the first pixel 6011a, flag "0" is stored for the Z bit in the pixel data.

On the other hand, since pixel data is stored in the second pixel 6001a due to the previous drawing of the triangle 600a, a flag "1" is stored in the Z bit thereof. The pixel data for the first pixel 6001a is rewritable because the Z bit thereof is "0", therefore the pixel data is masked with "0" by the graphics mask 542a. Further, since the Z bit of the pixel data for the second pixel 6001a is "1", the pixel data is masked with "1" by the graphics mask 542a and is output to the ALU 545a as masked pixel data 540a. Still further, the pixel data 5138a of the second pixel 6001a is input as it is to the ALU 545a. Since the pixel data of the first pixel 6001a is rewritable, the ALU 545a rewrites the pixel data as pixel data 513a for the first pixel 6011a and draws on the frame buffer 60a as new pixel data. On the other hand, since the pixel 6001a is prohibited from being rewritten because the Z bit thereof is "1", the pixel data 5138a of the second pixel 6001a is output as it is without using the pixel data 5139a.

According to the present embodiment, the rewritability is judged for every pixel unit based on the Z bit value and drawing of graphics is performed according to the judgement result therefore, only the graphics in a deeper location can be successively drawn without subjecting graphics closer to the viewer to rewriting. Since it is sufficient to simply provide a flag of 1 bit as information necessary for judging the overlapping of graphics, the capacity of the frame buffer 60a can be reduced.

Figure 31:
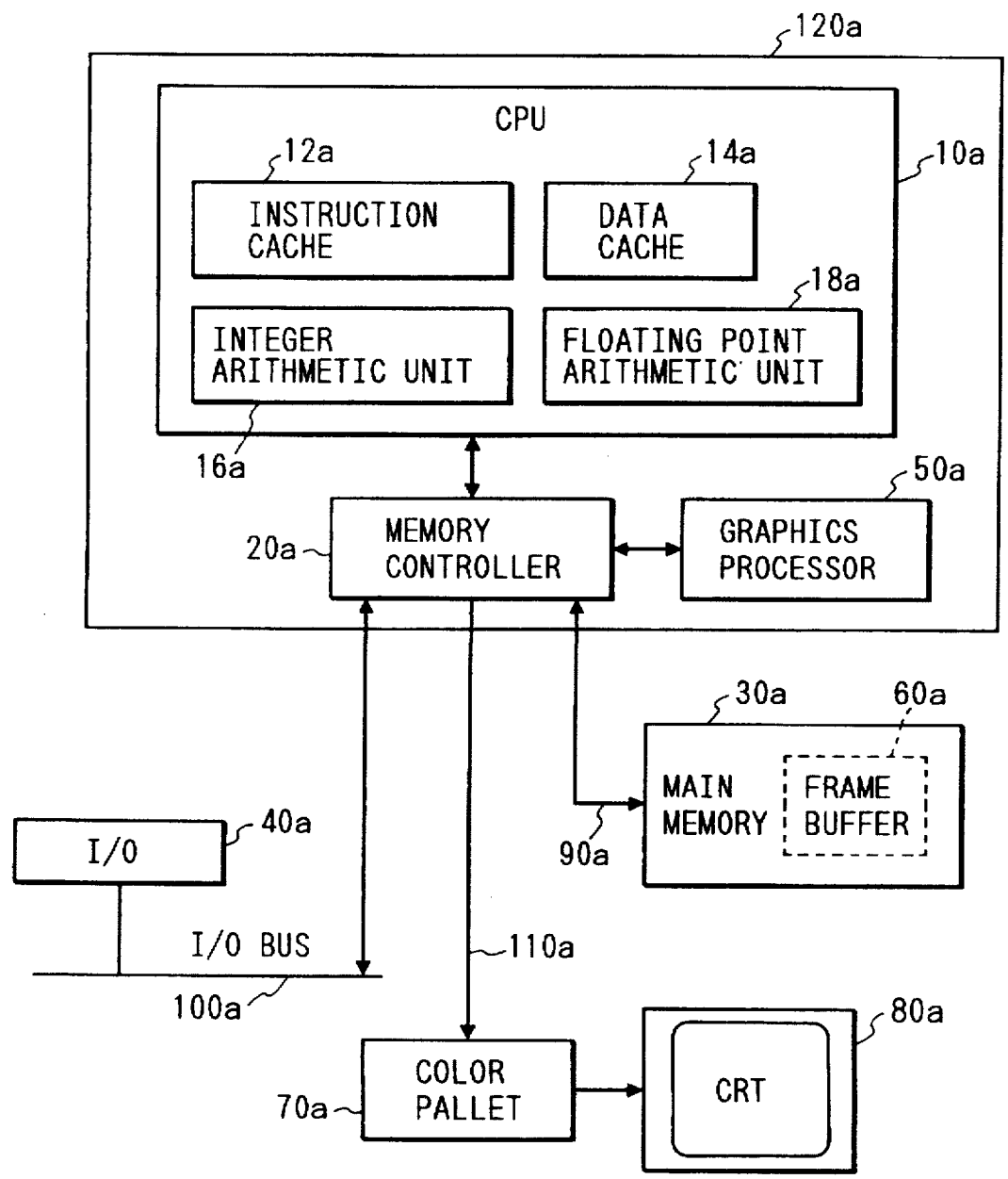
FIG. 31 is a general block diagram of another embodiment of a three dimensional graphics display device according to the present invention.

In the above embodiment, the CPU 10a and the graphics processor 50a are constituted by separate LSIs, however, as shown in FIG. 31 these are constituted by a single LSI. Namely, the CPU 10a, the memory controller 20a and the graphics processor 50a are integrally formed on a common LSI 120a. Further, the main memory 30a can incorporate the frame buffer 60a. In this case, display data in the frame buffer 60a is read by the memory controller 20a, transferred to the color pallet 70a via the display bus 110a and is displayed as an image according to the display data on the screen of the CRT 80a.

Figure 32:
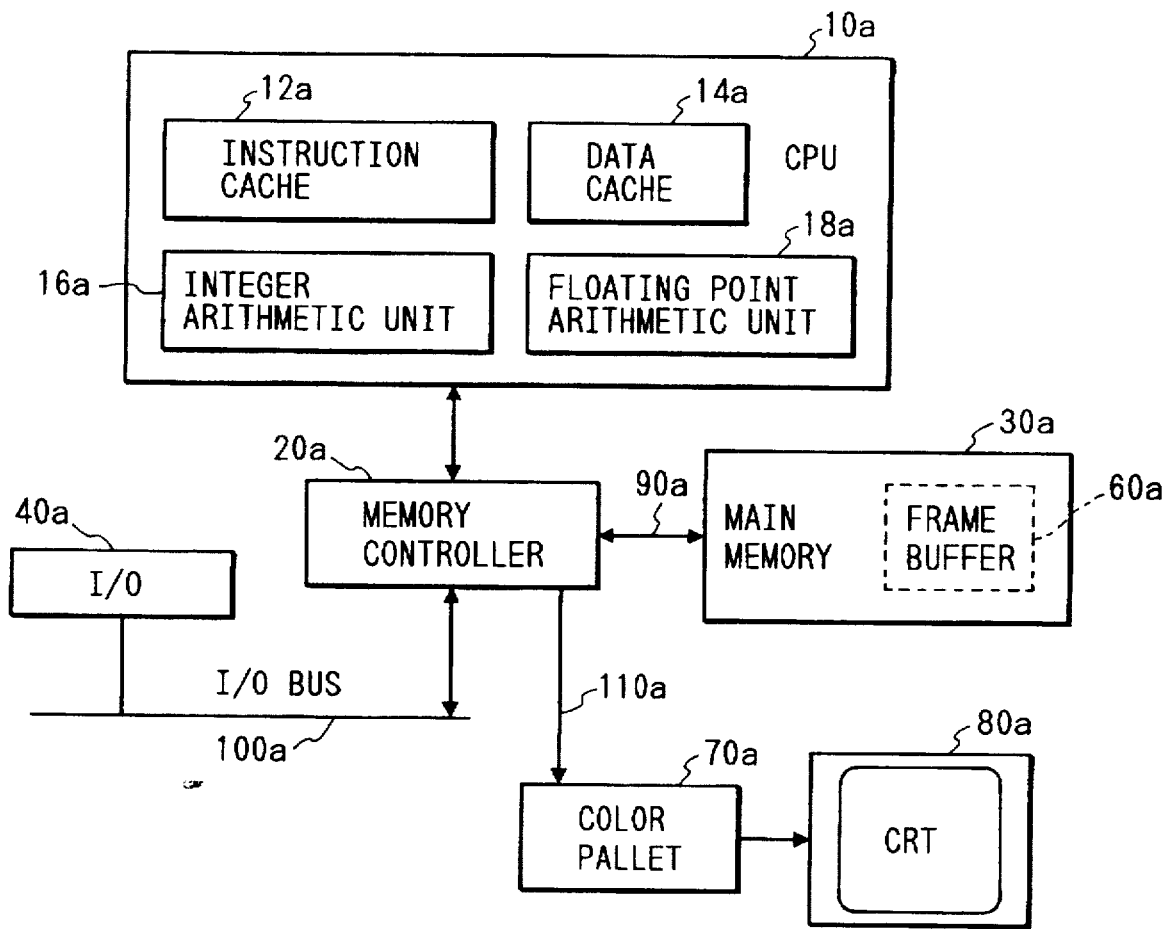
FIG. 32 is a general block diagram of still another embodiment of a three dimensional graphics display device according to the present invention.

FIG. 32 shows an example of other system in which drawing on the frame buffer 60a is performed by the CPU 10a without using the graphics processor 50a. In this embodiment, all of the drawing processings performed by the graphics processor 50a in FIG. 25 are performed by the CPU 10a.

Hereinbelow, an embodiment in which overlapping of graphics is checked by the CPU 10a and no drawing is performed for graphics completely hidden will be explained. In this embodiment, a plurality of triangles are treated as one group.

Figure 33:
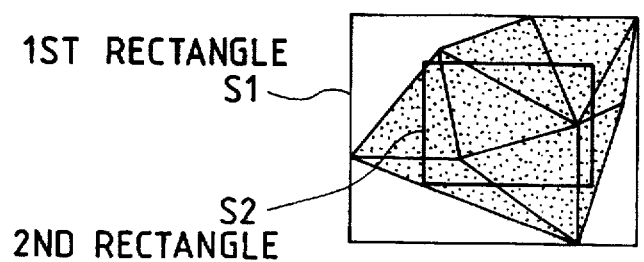
FIG. 33 is a diagram for explaining the definition of a circumscribed rectangle and an inscribed rectangle for a graphic group.

As shown in FIG. 33, for to one group of a plurality of triangles, a first circumscribed rectangle S1 and second inscribed rectangle S2 for the graphic represented by the group are defined corresponding to the drawing region. Then, overlapping of a plurality of groups is checked based on the definition, for example, when a first rectangle S1 in group 1 completely overlaps a second rectangle S2 in group 2, the triangles in group 1 are hidden, therefore the triangles need not be drawn.

Figure 34:
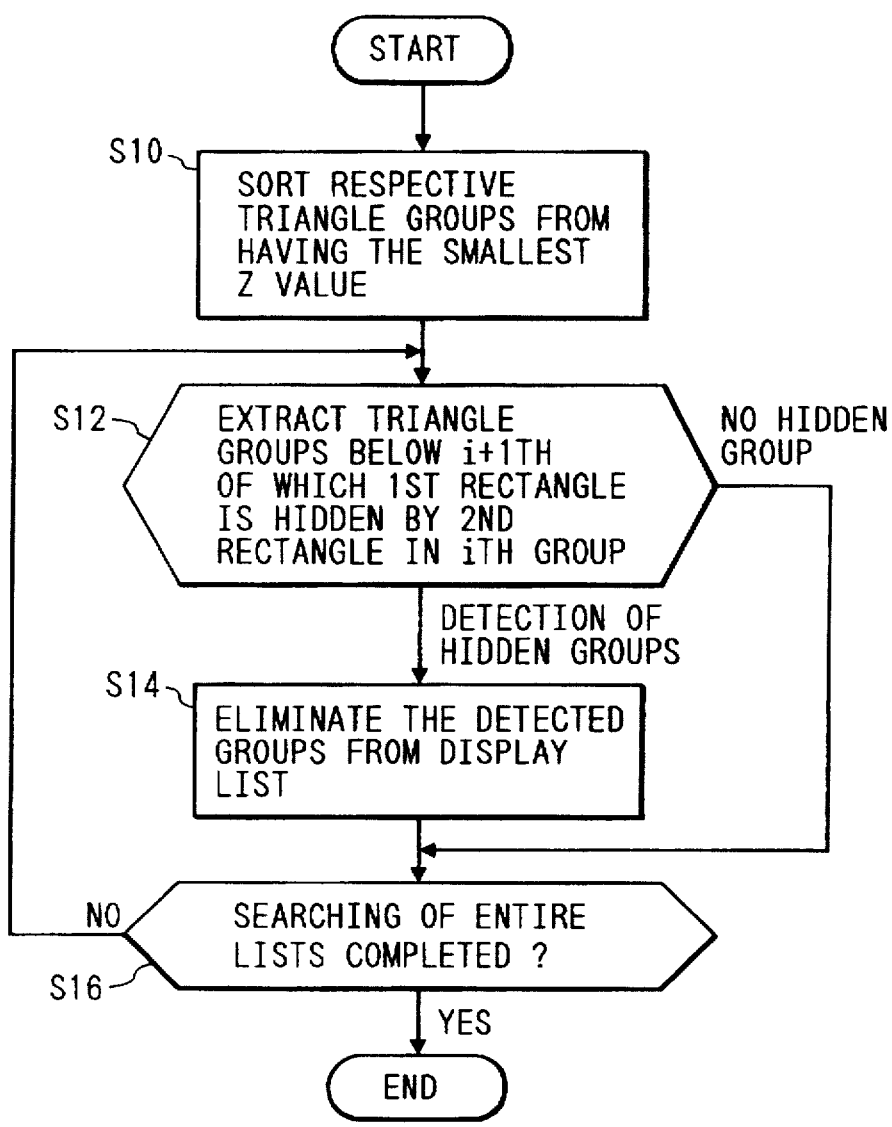
FIG. 34 is a flowchart for explaining a processing using the circumscribed rectangle and the inscribed rectangle.
Figure 35:
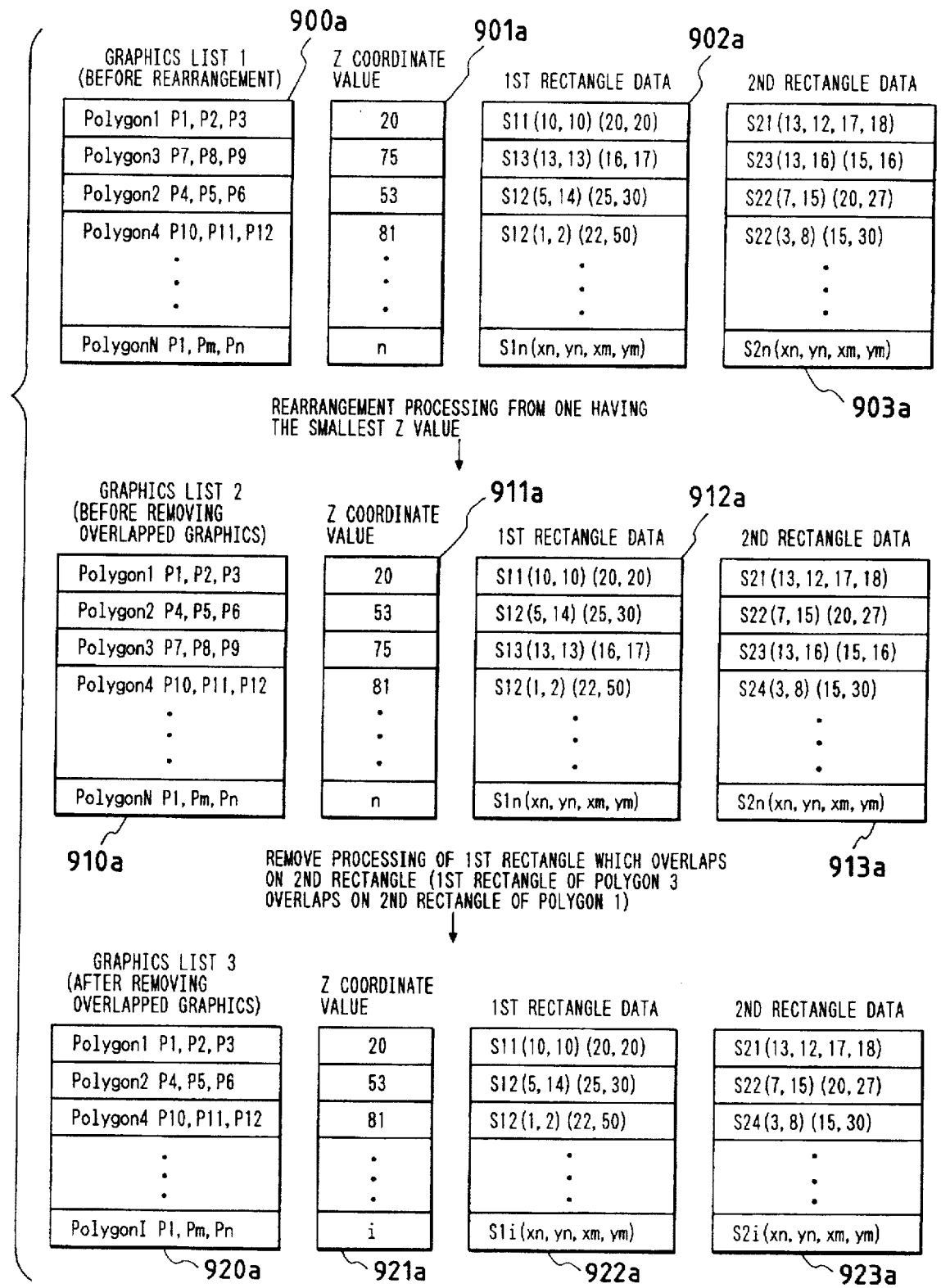
FIG. 35 is a diagram for explaining an example of a table when a hidden graphic is deleted.

Processing contents for performing the above method are explained with reference to FIG. 34 and FIG. 35. A graphics list is produced successively by a group unit from a group closer to the viewer with respect to graphics to be displayed.

For example, when a cluster of triangle groups is constituted by a graphics list containing graphics divided into 1–N polygons, the polygons in the respective groups are rearranged according to Z coordinate values of the respective polygons from one having the smallest Z coordinate value (steps 10). After performing this process, the graphics list 900a having a polygon order of polygon 1, 3, 2 and 4 is rearranged into a polygon order of polygon 1, 2, 3 and 4 to produce graphics list 910a. Subsequently, the graphics list is successively retrieved to check whether or not a certain group is hidden by another group. Namely a judgement is made as to whether a second rectangle (inscribed rectangle) in an ith group hides a first rectangle (circumscribed rectangle) in an i+1th group or below an i+1th group to thereby extract hidden groups (step S12). For example, with regard to the second rectangle data 913a, first rectangle data 912a hidden thereby is retrieved. In the example shown in FIG. 35, since the first rectangle of polygon 3 is hidden by the second rectangle of polygon 1, the polygon 3 is deleted from the graphics list (step S14). Through this process, the graphics list 910a is reproduced as graphics list 920a. These processes are performed for all of the graphics lists (step S16).

According to the present embodiment, prior to drawing the graphics according to the graphics lists, hidden graphics which need not be drawn are deleted from a plurality of graphics lists, so that the processing when displaying a three dimensional graphics image is speeded-up.

When both methods as shown in FIG. 24 and FIG. 33 are used, the capacity of the frame buffer 60a is reduced and the processing is speeded-up because of the elimination of, drawing of hidden graphics.

Now, a method of reducing processing for Z comparison will be explained.

Figure 36:
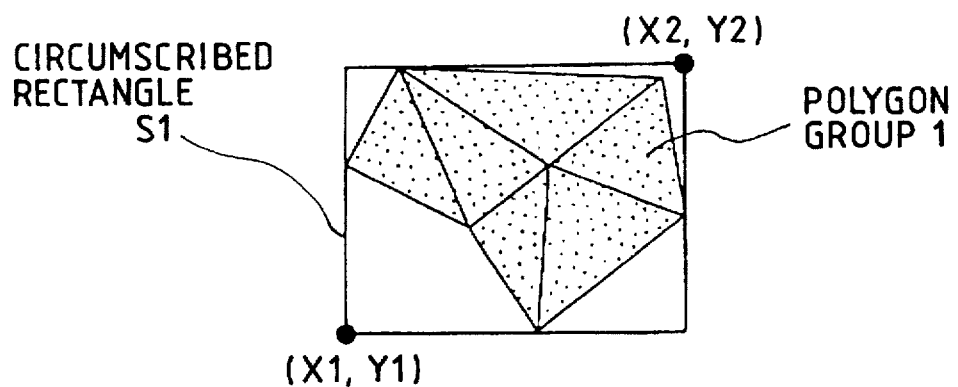
FIG. 36 is a diagram illustrating an example of a circumscribed rectangle for a graphic group when Z comparison is eliminated.

As shown in FIG. 36, in order to reduce the Z comparison processing, rectangles circumscribing a plurality of polygons are defined as circumscribed rectangles S1 for the respective drawing regions. When a circumscribed rectangle S1 circumscribing a polygon group 1 represented by a set of plurality of triangles does not overlap with a circumscibed rectangle circumscibing another polygon group, Z comparison between the respective polygon groups is eliminated.

Figure 37:
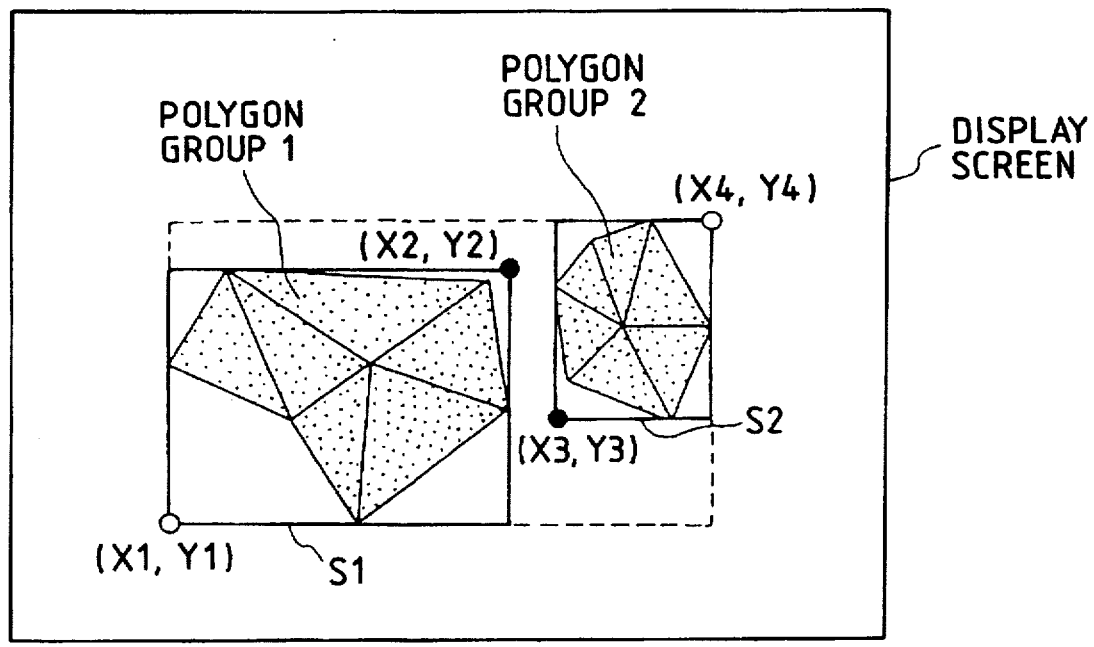
FIG. 37 is a diagram illustrating a drawing example in case of no graphics overlapping when a Z comparison eliminating method is used.

For example, for shown in FIG. 37 as a drawing region of a circumscibed rectangle S1 circumscribing the polygon group 1, (X1, Y1) and (X2, Y2) are set and these values are stored in the graphics processor 50a. Subsequently, when drawing polygon group 2, for a drawing region of a circumscribed rectangle S2 circumscribing the polygon group 2, (X3, Y3) and (X4, Y4) are defined and in the same manner are stored in the graphics processor 50a. Thereafter, it is judged whether or not the circumscribed rectangle S1 and circumscribed rectangle S2 overlap each other, and when it is judged that they do not overlap each other, after drawing the polygon group 2, the already drawn region is renewed to (X1, Y1) and (X4, Y4).

Figure 38:
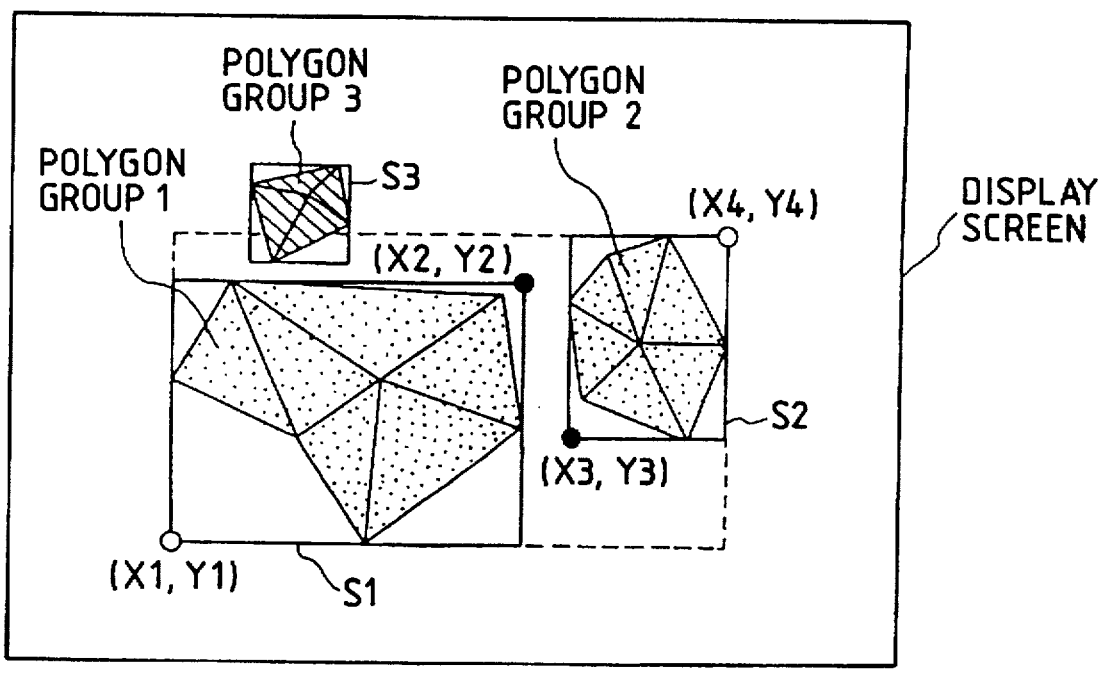
FIG. 38 is a diagram illustrating a drawing example in case of graphics overlapping when a Z comparison eliminating method is used.
Figure 39:
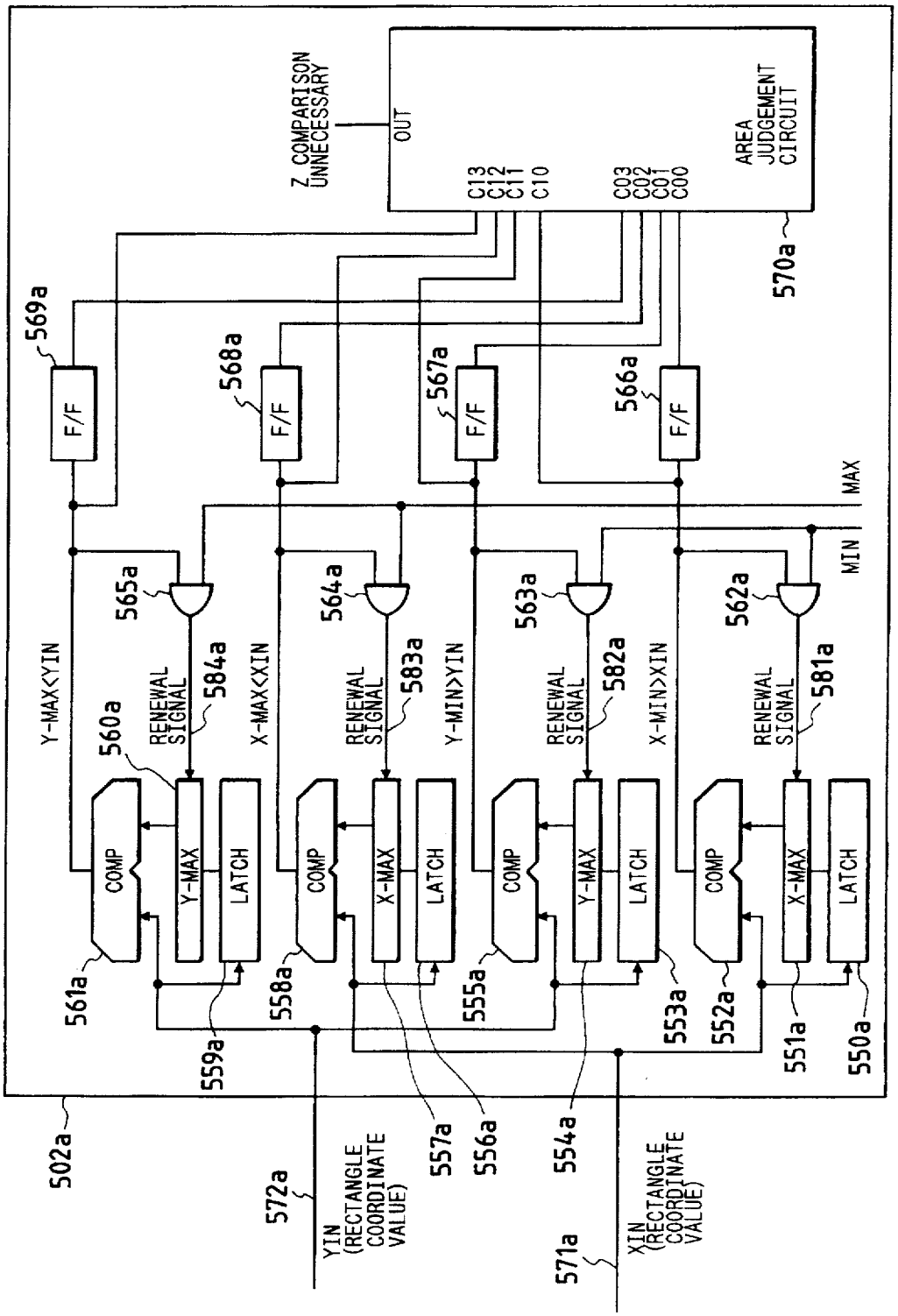
FIG. 39 is a block diagram of a Z comparison unnecessity detection circuit.
Figure 40:
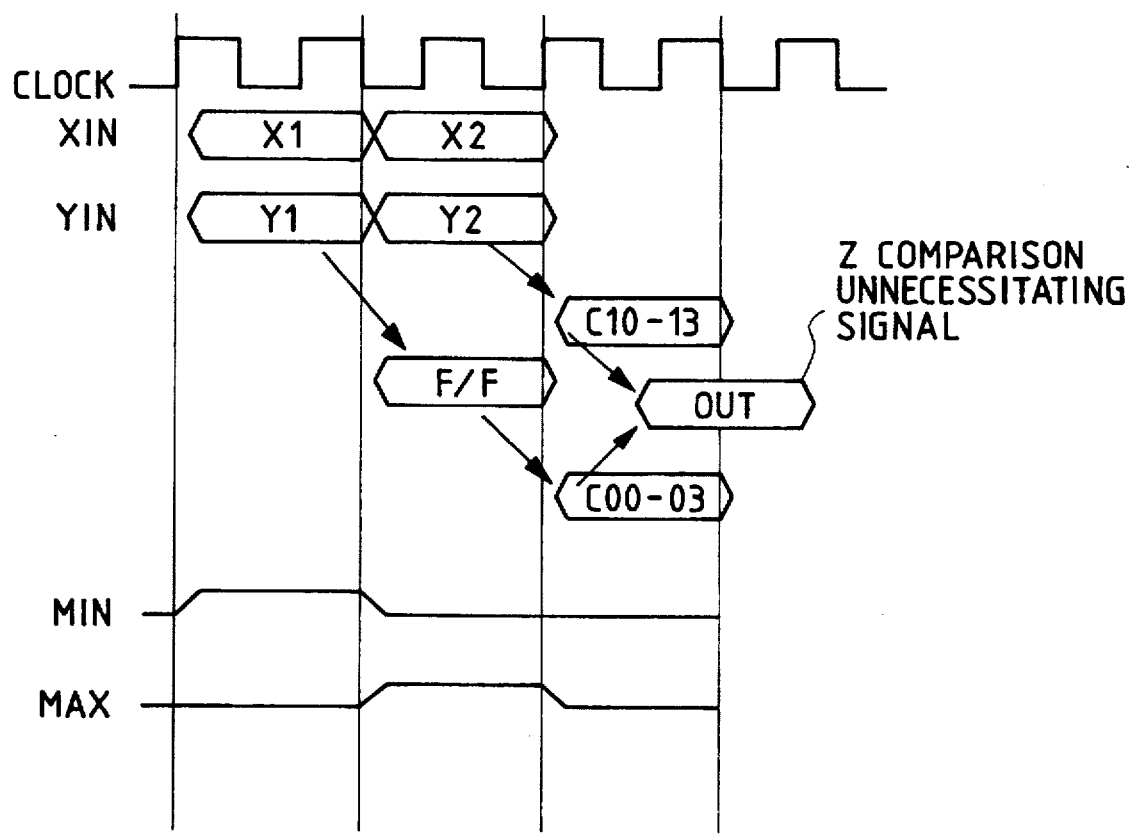
FIG. 40 is a time chart illustrating an operation of the Z comparison unnecessity detection circuit.

Then, as shown in FIG. 38, as a drawing region of a a circumscribing rectangle S3 circumscibing polygon group 3, (X5, Y5) and (X6, Y6) is defined and stored, and it is determined whether or not the circumscribed rectangle S3 overlaps with the already drawn region. In the present example, since the circumscribed rectangle S3 overlaps a part of the already drawn region, Z comparison is performed for every pixel unit of the polygon group and it is checked whether or not the graphics actually overlap each other. These processings are performed by the Z comparison unnecessity detection circuit 502a in the graphics processor 50a, of which a specific circuit is shown in FIG. 39.

The Z comparison unnecessity detection circuit 502a is provided with and a latch 550a, a register (X-MIN) 551a, a comparator 552a, a latch 553a, a register (Y-MIN) 554a, a comparator 555a, a latch 556a, a register (X-MAX) 557a, a comparator 558a, a latch 559a, a register (Y-MAX) 560a, a comparator 561a, AND gates 562a, 563a and 565a, flip-flops 566a, 567a, 568a and 569a and a region judgement circuit 570a. To a terminal 571a a X coordinate value XIN among the coordinate values of the circumscribed rectangle is input, and to a terminal 572a, a Y coordinate value YIN is input. Further, the circuit is constituted so that, when a minimum value among the coordinate values is input, a terminal 573a is set at "1" and, when a maximum value is input, a terminal 574a is set at "1". The judgement processing according to the coordinate value is performed along the time chart shown in FIG. 40.

A first, when as the coordinate value of one vertex point of the circumscribed rectangle of the graphic to be drawn a minimum value of the XY coordinate is input from the terminals 571a and 572a, the terminal 573a is set at "1" and as the respective register values and the input data are compared in the respective comparators 552a, 555a, 558a and 556a. In this case, in the register 551a, the minimum value of the X coordinate, in register 554a, the minimum value of the Y coordinate, in register 557a, the maximum value of the X coordinate and in register 560a the maximum value of the Y coordinate are respectively already set together with the already drawn graphics.

The comparators 552a and 555a output a high level signal when the input data value is smaller than the respective register value, and otherwise they output a low level signal. The comparators 558a and 561a output a high level signal when the input data value is larger than the respective register values, and otherwise they output a low level signal. When a high level signal is output from the comparators 552a and 555a, it is judged that data smaller than the respective and the values is input and the register values in the registers 551a and 554a are automatically renewed by renewal signals 581a and 582a.

Subsequently, when as a coordinate value of another vertex point of the circumscribed rectangle of the graphic to be drawn a maximum value of the XY coordinate is input to the terminals 571a and 572a, a terminal 574a is set at "1" and as the respective register values and the input data are compared in the respective comparators 552a, 555a, 558a and 560a. When a high level signal is output from the comparators 558a and 561a, it is judged that a data value larger than the respective register values is input, and the register values in the registers 557a and 560a are automatically renewed by renewal signals 583a and 584a. The output signals of the respective comparators 552a, 555a, 558a and 561a are output to the region judgement circuit 570a in which overlapping of regions is checked.

Figure 41:
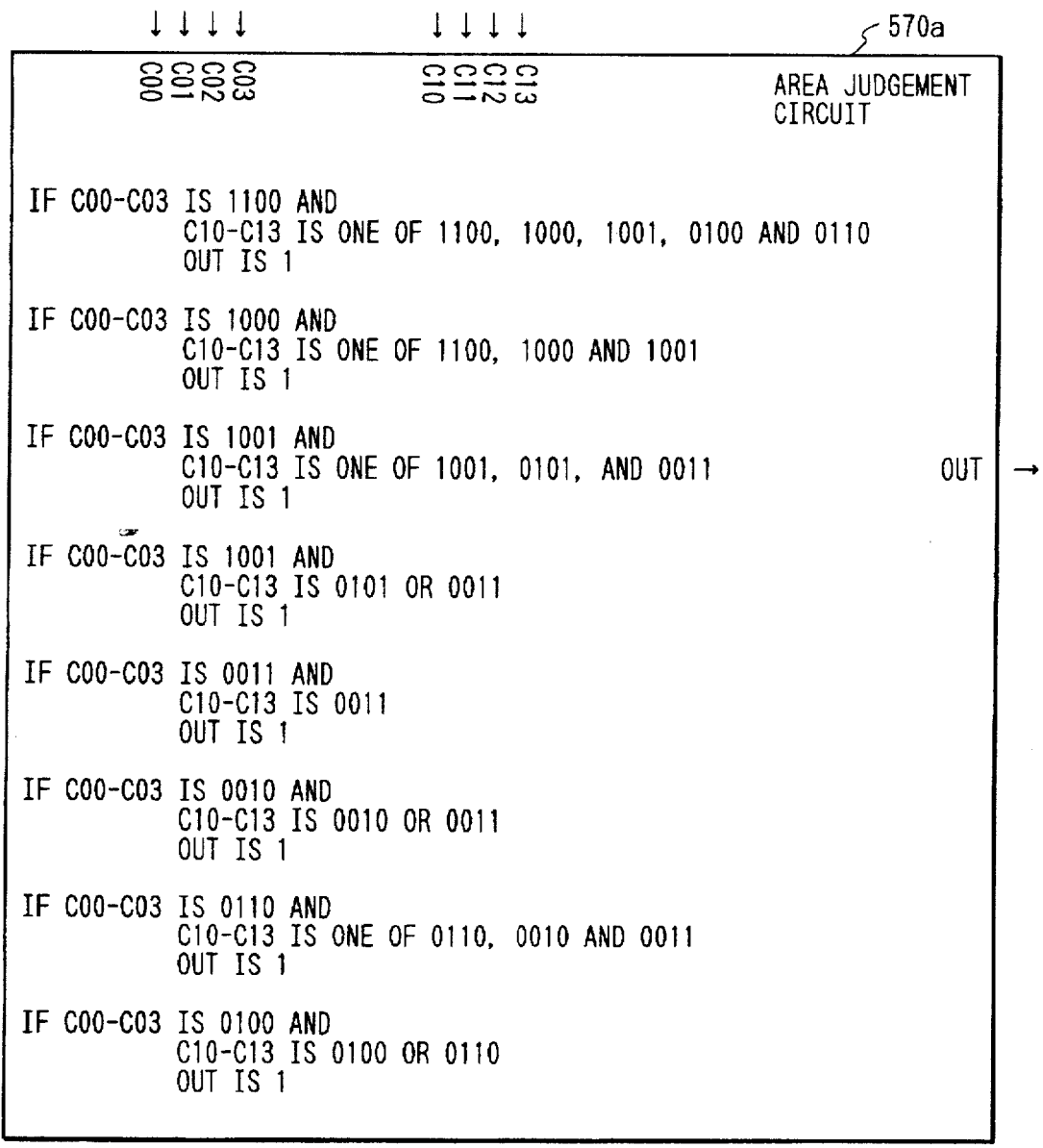
FIG. 41 is a diagram for explaining the logic of a region judgement circuit.

The region judgement is performed according to logic as shown in FIG. 41. When there are no region overlappings, a high level signal representing a Z comparison unnecessity signal is output a when regions overlap, a low level signal representing Z comparison necessity is output. The signal is input to the decoder 503a in the graphics processor 50a. When the input signal is active (a high level), the decoder 503a controls the drawing use DDA control unit 505a and the memory access and pixel arithmetic control unit 506a so as not to perform the Z comparison during a graphics drawing operation. Through these controls, when there are no graphics overlapping the data read from the frame buffer 60a and the Z value comparison during the drawing is unnecessitated it is sufficient if the graphics data is simply drawn into the frame buffer 60a therefore, a three dimensional graphics display can be generated at high speed. Further, since the management of the already drawn regions is automatically performed by hardware (Z comparison unnecessity detection circuit 502a), the burden of the software is reduced and a high speed processing is realized.

Now, a specific example of a method of reducing the Z comparison processing will be explained.

An example as shown in FIG. 38, in after the polygon group 1 has been drawn the polygon group 2 will be to be drawn is explained by applying numerical data to the circuit as shown in FIG. 39.

When it is assumed that the coordinates of the circumscribed rectangle S1 as shown in FIG. 38 are respectively (10, 20) and (60, 70), 10 is set at a register 551a, as shown in FIG. 39, 20 is set at a register 554a, 60 is set at a register 557a and 70 is set at a register 560a. Under this condition, when coordinate values (80, 30) and (100, 110) for the polygon group 2 are defined and the smaller coordinate value of the XY coordinate is input, a terminal 573a is set at "1" and a terminal 571a input of 80 and a terminal 572a inputs of 30. When these values are compared with the respective register values in comparators 552a, 555a, 558a and 561a, the comparator 552a outputs "0", the comparator 555a outputs "1", the comparator 558a outputs "1" and the comparator 561a outputs "0". Then, these resultant outputs are temporarily stored in flip-flops 566a–569a, thereafter they are input to terminals C00–C03 for the region judgement circuit 570a.

Subsequently, when a larger coordinate value of XY coordinate is input, a terminal 574a is set at "1" and the terminal 571a input 100 and the terminal 572a input 110 and these values are compared with the respective register values in the comparators 522a, 555a, 558a and 561a. As the comparison results, the comparator 552a outputs "0", the comparator 555a outputs "0", the comparator 558a outputs "1" and the comparator 561a outputs "1", and these comparison results are input to input terminals C10–C13 for the region judgement circuit 570a. Further, in this case since the respective inputs of AND gates 564a and 565a are set at "1", the register values in the registers 557a and 560a are automatically renewed by renewal signals 583a and 584a. Namely, the maximum value of the X coordinate is renewed to 100 and the maximum value of the Y coordinate is renewed to 110.

Subseqently, the region judgement circuit 570a judges, with regard to the signal status inputted to the input terminals C00–C13 whether or not the Z comparison is necessary based on the logic shown in FIG. 41. In the present example, since the input terminals C00–C03 indicate 0010 and the input terminals C10–C13 indicate 0011, which meets a condition for setting the output terminal OUT to "1", a high level signal representing the Z comparison unnecessity signal is output from the output terminal OUT. In this case the memory access and pixel arithmetic control unit 506a does not perform the control of reading the data at the drawing destination, but directly draws the drawing data produced from the pixel arithmetic control unit 513a into the frame buffer 60a. When performing the Z comparison, it is necessary to draw, via a read-modify-write operation every pixel into the frame buffer 60a however, when no Z comparison is performed the drawing can be performed only by the write operation, thereby a high speed drawing is realized.

When coordinates (20, 105) and (30, 120) representing coordinates of the drawing region of the polygon group 3 are input for drawing the polygon group 3, the register 551a is set at 10, the register 554a is set at 20, the register 557a is set at 100 and the register 560a is set at 110, then overlapping of graphics is judged. In this case when the smaller coordinate value as the coordinate value of the polygon group 3 is input, all of the outputs of the respective comparators 552a, 555a, 558a and 561a are rendered "0". Subsequently, when the larger coordinate value representing the coordinate value of the polygon group 3 is input, the outputs of the comparators 552a, 555a and 558a are rendered "0" and the output of the comparator 561a is rendered "1". When these signals are input to the region judgement circuit 570a, condition that all of the input terminals C00–C03 are "0" does not meet the logic as shown in FIG. 41 the output at the output terminal OUT is set to a low level. Namely, since the circumscribed rectangle of the polygon 3 overlaps with an already drawn rectangle, in a manner similar to the FIG. 24 embodiment, it is judged, during the graphics drawing by making use of the Z bit, whether or not the respective pixels are in a drawing prohibited status.

Figure 42:
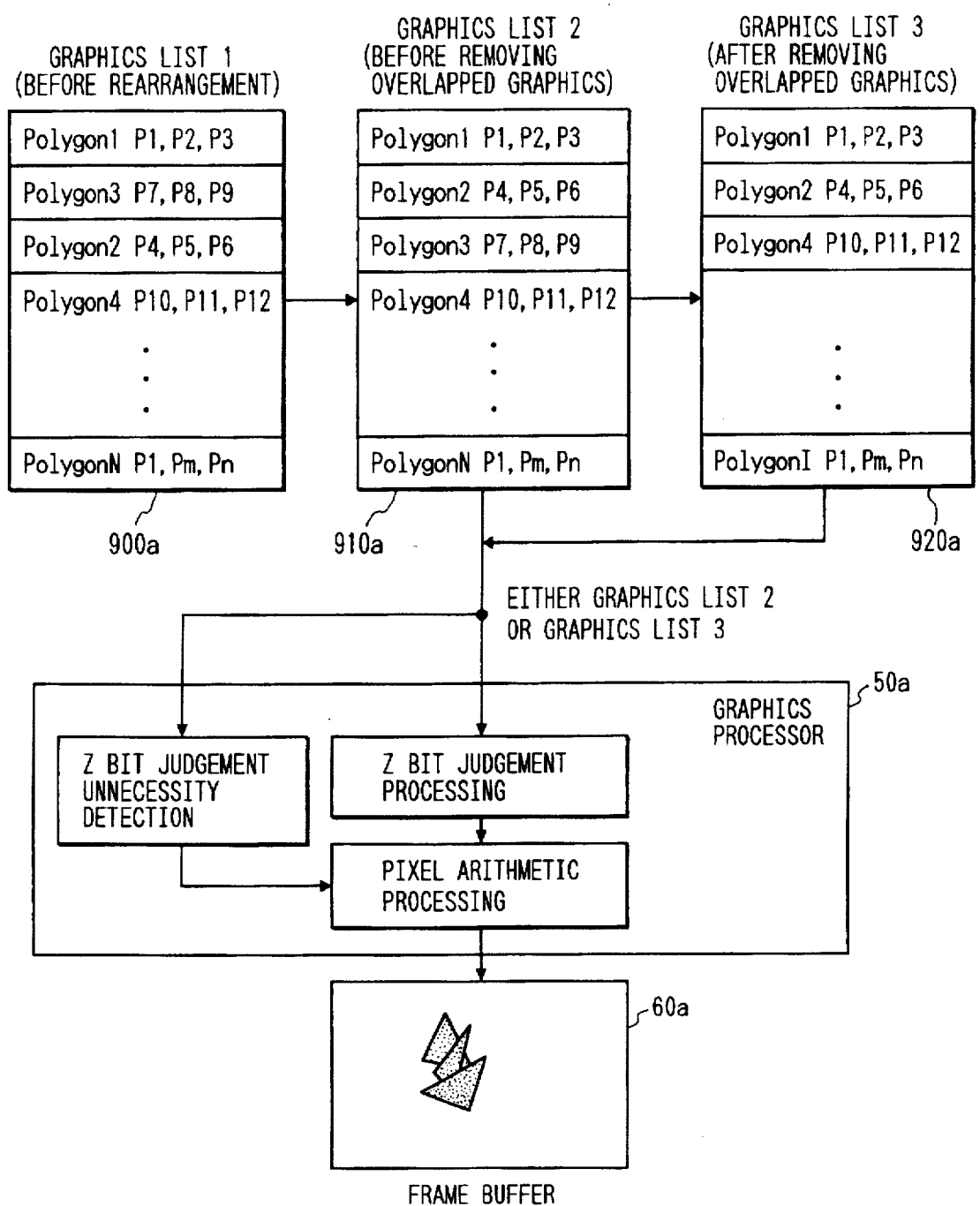
FIG. 42 is a diagram for explaining processings by the three methods according to the present invention.

FIG. 42 shows a summary of the methods as explained above. Namely, at first unnecessary graphics are deleted from the graphics list 900a. Then, the graphics processor 50a performs drawing for the graphics not overlapping while eliminating the Z bit judgement. Further, for the graphics which require the hidden surface processing the drawing is performed according to the method as shown in FIG. 24 while performing the Z bit judgement. These processings include the following methods.

(1) Overlapping is checked by graphics group units and hidden graphics are deleted from the graphics list.

(2) Overlapping is checked by graphics group units and the Z bit judgement for the graphics not overlapping is eliminated.

(3) The graphics list is successively sorted from the closest graphic to the viewer and the judgement on the Z bit representing data already written is performed.

These three methods can be used independently or alternatively they can be combined to constitute a system.

As explained above, according to the present embodiments, data representing whether or not the pixels are already drawn are written in the data storage region storing the drawing use graphics data, and the information required for judging whether the graphics overlap is limited, so that the required storage capacity of the data storage region can be reduced.

Figure 43:
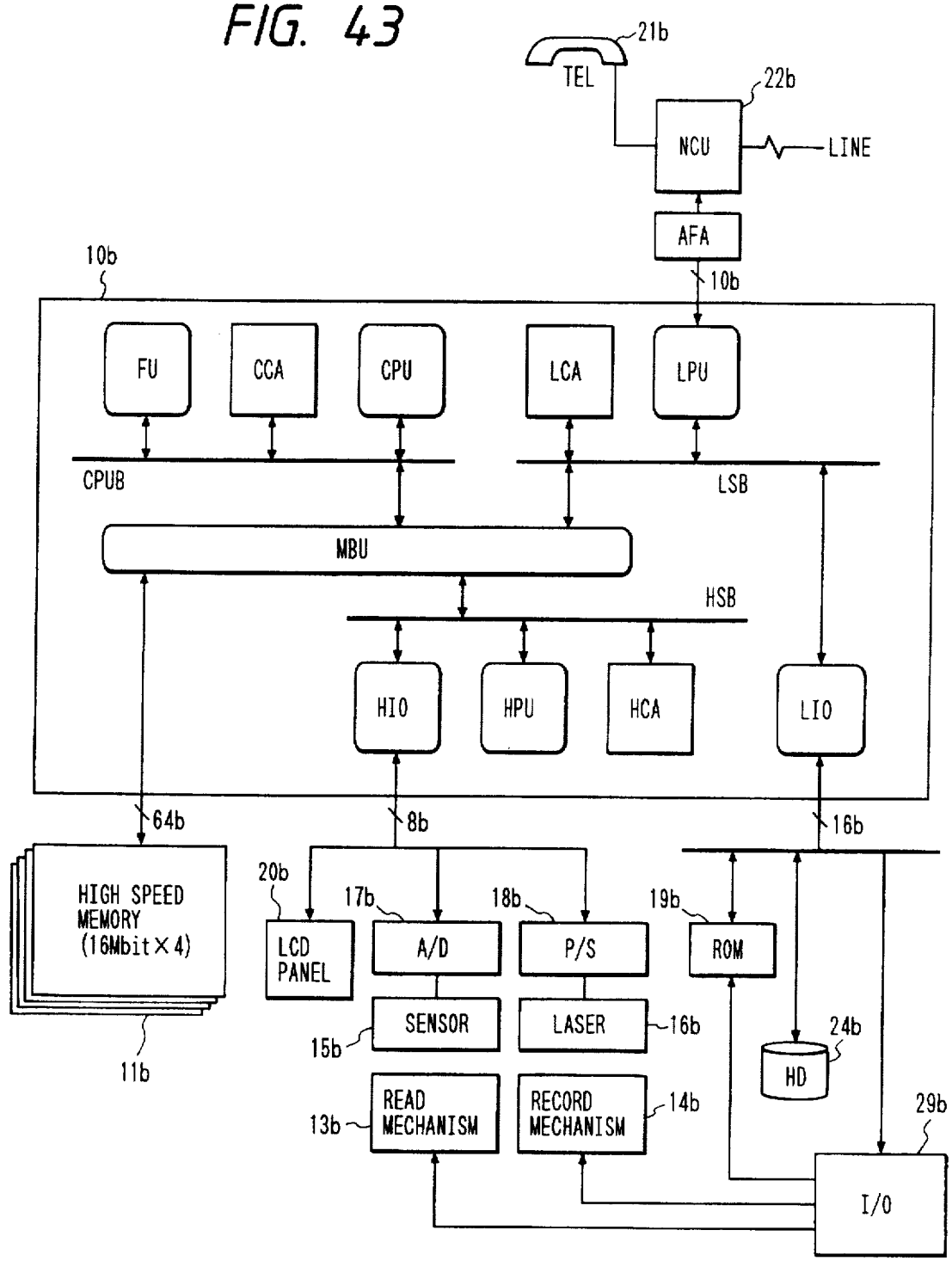
FIG. 43 is a block diagram of a further embodiment of the present invention.

FIG. 43 is a block diagram showing another embodiment of the present invention. The image processing processor 10b uses an internal three bus structure of a CPU bus CPUB, a high speed bus HSB and a low speed bus LSB.

The CPU bus CPUB connects a central processing unit CPU, a cache CCA and a floating point arithmetic unit FU. The CPU bus CPUB is connected to a memory bus controller MBU. The central processing unit CPU a CPU of the RISC (Reduced Instruction Set Computer) type.

Accordingly, the performance which conventionally can be realized only by separate LSIs can be performed via software, more specifically, a RISC exceeding 100 MIPS can perform graphics processing of about 10 MHz. Namely, by integrating the processings which were conventionally performed by separate LSIs into one CPU, the memories can be also integrated. Thereby, the parts cost, such as memories and separate LSIs can be reduced the area for the installation base and the number of an hour for assemblying the parts can be reduced.

The high speed bus HSB connects a high speed IO processor HPU, a high speed bus interface HIO, a high speed bus buffer HCA and the memory bus controller MBU. The high speed IO processor HPU is a unit which performs image processings required for a facsimile machine, such as distortion correction, high quality image processing and conversion between raster information and code and vector information. Specific functions thereof include driving, spacial filtering, decoding coded data and developing it into raster information, detecting varied point of raster information and coding and developing vector information. The high speed bus interface HIO performs interfacing between the data of the high speed bus HSB and a high speed IO device. More specifically, the high speed bus interface HIO deals with display data to a display, print data to a laser printer and image data from a photo sensor. The data of the high speed bus HSB is interfaced with other buses via the memory bus controller MBU.

The low speed bus LSB connects a low speed IO processor LPU, a low speed bus interface LIO, a low speed bus buffer LCA and the memory bus controller MBU. The low speed bus interface LIO interfaces between the data of the low speed bus LSB and a low speed IO device. More specifically, the low speed bus interface LIO deals with output data to a read only memory ROM, a file FILE and a printer and data for controlling devices such as a paper transferring mechanism, via an external IO control unit I/O.

The low speed IO processor LPU controls devices such as a timer, and inputs and outputs modem signals connected to a communication passage via a network control unit NCU. The network control unit NCU includes a function to switch between signals from a telephone TEL, and a serial communication controller SCU transfers the data of the high speed bus HSB to a synchronous DRAM SDRAM.

Through the independent provision of the memory use bus, as explained above, a high speed memory can be connected easily. Further, due to the separation between the high speed IO, and the low speed IO the addressing is facilitated and the burden of the buses is lightened, which contributes to a high speed data transmission.

Before explaining signal flow, a flow of facsimile functions will be explained.

At first, during signal transmission, the image data read by the sensor 15b is converted into digital data by an A/D converter 17b, read via the high speed bus interface HIO into the high speed bus HSB, and read by the high speed IO processor HPU to perform image processing. Among the above processings a sum of products arithmetic operation, such as spacial filtering, can be efficiently performed by making use of the floating point arithmetic operating unit FU. All of the local memories, such as a line memory, are integrated into the high speed memory 11b constituting the main memory. The CPU normally performs arithmetic processing by making use of the cache memory CCA. However, when a request for data which is not in the cache memory is generated, the CPU issues a memory request to the memory bus unit MBU and fetches predetermined data in the high speed memory. However, when performing the read image processing, including such processing as a distortion correction processing, a high quality image processing and a coding processing, the necessary data and timing can be determined in advance therefore, it is possible to determine bus scheduling in advance. The above, mentioned timing will be explained in detail later. The modem processing, which was conventionally performed by separate LSIs, can be realized during CPU processing by using the bus scheduling. In the explanation thus for the modem processing was referred to based on an analogue telephone network but the same is also applicable to ISDN and wireless signal transmission. After being converted into communication use data, the data is transmitted via the low speed bus interface LIO to the network control unit NCU and is supplied to the telephone network. When image processing is completed by one line unit, the CPU commands the I/O control unit 29b via the low speed IO processor LPU and the low speed bus interface LIO and drives the read mechanism 13b.

During signal reception, the data from the telephone network is input via the network control unit NCU and is subject to recorded image processing such as decoding, by the high speed IO processor HPU via the low speed IO processor LPU. The image data can be displayed on the display 20b via the high speed bus interface HIO, or alternatively it can be printed by a laser printer 16b after converting it into series data using a parallel serial converter P/S.

Figure 44:
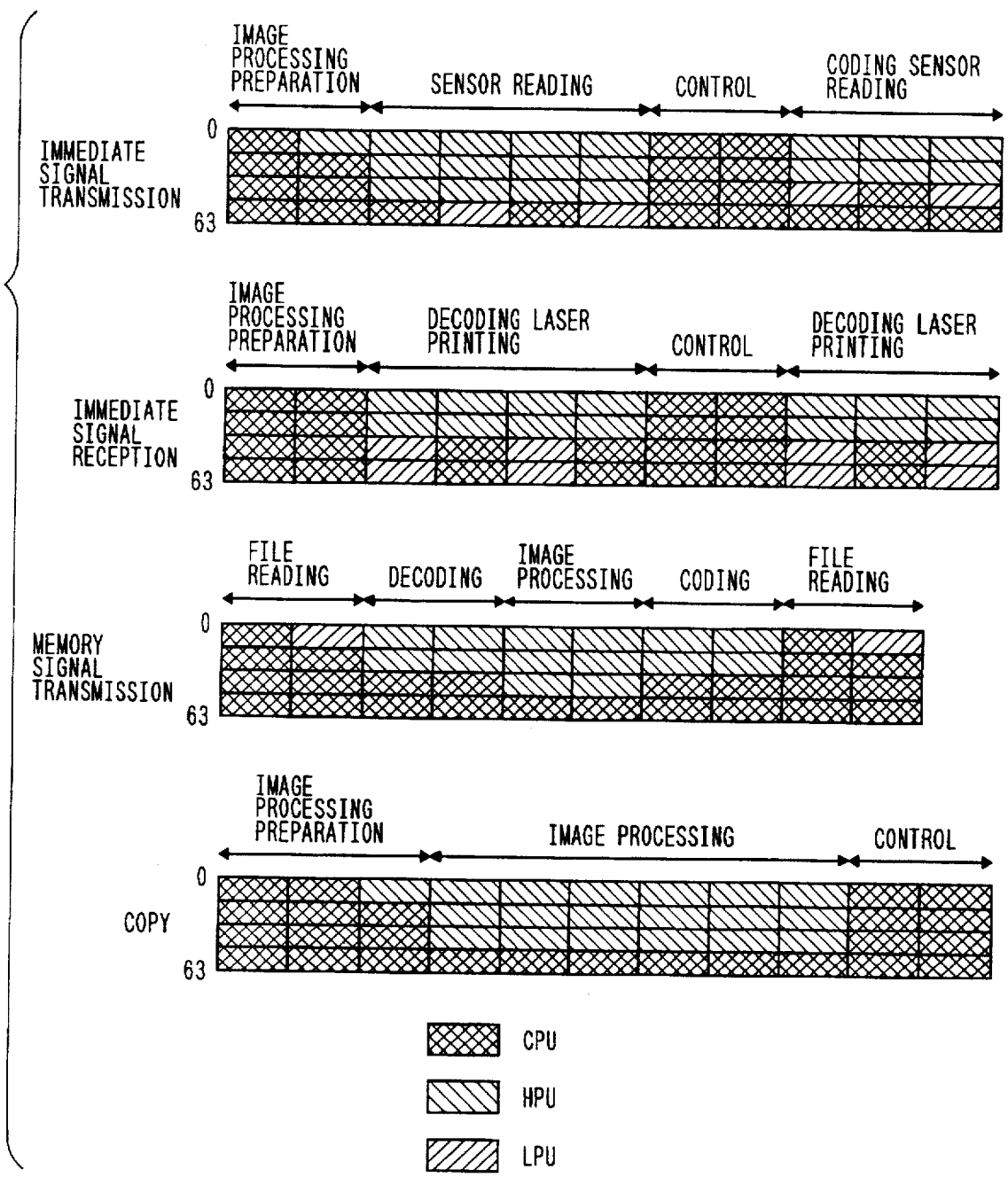
FIG. 44 is a diagram illustrating an example of the allotment of a memory bus when performing immediate signal transmission, immediate signal reception, memory transmission and copying.

Now the memory bus scheduling will be explained with reference to FIG. 44. In order to perform a multitask processing using a CPU, the tasks are generally switched via timer interruption and a virtual parallel processing is performed. The cycle is currently about 20 msec. The switching at this cycle is not applicable for the processing in image related machines, such as a facsimile machine. For example, one line scanning time in facsimile machines is from about 1 msec to 10 msec. It is necessary to the complete processing of 4000 pixels within this period. However, although the concerned image processing requires a high speed the processing order is fixed so that the scheduling thereof is easy. For this reason, it is possible to allot the memory bus use time in advance. FIG. 44 shows an example of memory bus allotment for immediate signal transmission, immediate signal reception, memory mode signal transmission and copying.

The immediate signal transmission is a mode in which a read manuscript is transmitted as it is and which is a normal facsimile signal transmission mode. The vertical direction in the drawing represents bit positions and the lateral direction represents time train which advances by a block unit. The one block, for example, shows an access processing of 256 words inclusively. However, the one block can correspond to 1 bite unit or further alternatively can correspond to much more larger unit, however it is preferable to be corresponded to a power of 2. During the image processing preparation period in the drawing at first 64 bits use all of the buses, the central processing unit CPU performs the drive and control, then 0–15 bits are opened for the high speed IO processor HPU and sensor signals fetched from the high speed bus interface HIO are written into the high speed memory. The central processing unit CPU reads the distortion correction program described in from 16 bit to 64 bit and executes the same. As seen from the above, the memory bus unit MBU has a function which permits variation of access manner in every memory module. Namely, although the address lines are common which is simply used for aligning column address, the row addresses, read-write mode and burst length can be separately set. Through this provision, simultaneous access to a memory from a plurality of processors is realized. When starting the manuscript signal reading from the sensor, the bus width permitted for the high speed IO processor HPU is enlarged from 0 to 47 bits to perform a high speed image processing. The bus from the 48 bit to the 63 bit is time-shared between the central processing unit CPU and the low speed IO processor LPU depending on their necessity.

The immediate reception is a mode in which the received signals are printed as they are. The processing amount of the recorded image processing is limited in comparison with that of read image processing such that the bus is limited to from the 0 to the 31 bit, and from 32 bit to 63 bit are provided for performing processings such as decoding and control, in the central processing unit CPU. This measure is taken in view of the fact that the processing amount of the decoding is much substantial which constitutes one of the bottle necks.

The memory signal transmission is a mode in which the manuscript information is read in advance and the data stored in memory is transmitted. Since the coded transmitting signal information is stored in the memory, the coded signals are first decoded, subjected to a size conversion and again coded depending on the decoding capacity of the receiving machine. The bus allotment is performed depending on the loads of the central processing unit CPU and the high speed IO processor HPU.

Since the copy mode need not require the coding and decoding processing, the control thereof is simplified however, since it is necessary to simultaneously perform the read image processing and the recorded image processing, bus allotment for the high speed IO processor HPU has to be increased.

Figure 45:
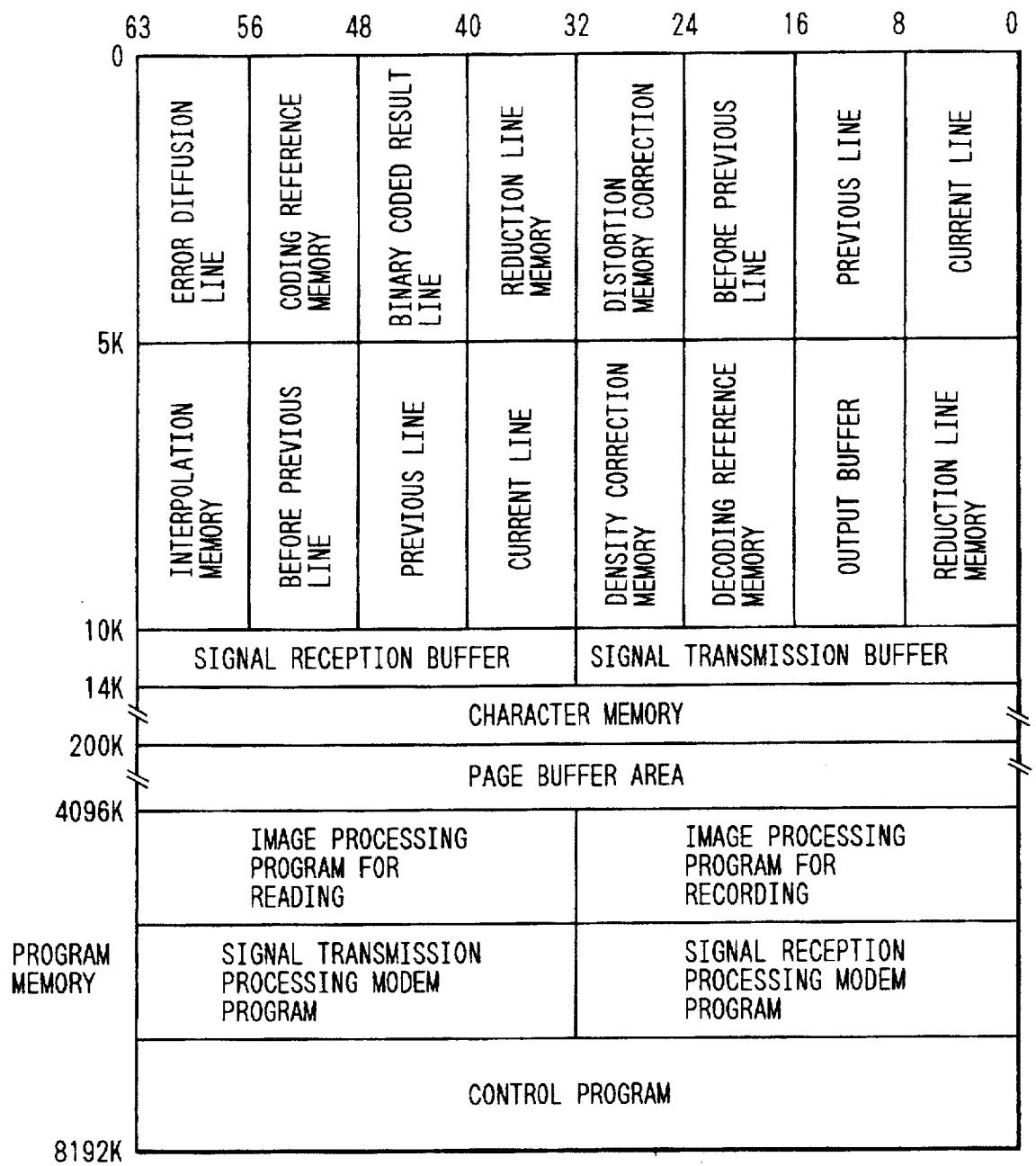
FIG. 45 is a diagram illustrating a an example of the mapping of a memory.

FIG. 45 shows an example of memory mapping. When assuming that the facsimile machine deals with a manuscript of A3 size paper with a resolution of 400 dots/inch, one line is about 5000 dots. Further, assuming one dot of 8 bits and a bus of 64 bits, then 8 dots are stored in the bus. Although it is further contemplated to access 8 dots as a pack, the conversion register required represent a large amount of hardware and because of the discontinuity of the addresses to be accessed, mishits are frequently generated, so that the access efficiency is significantly reduced. For this reason in the present embodiment, the bus is provided with bit ranges so as to permit separate accesses, to unnecessitate a back logic and to ensure continuity of the addresses.

Further, by describing the programs relating to reading in higher bits of the bus and mapping the data in lower bits, a simultaneous access is easily realized.

Figure 46:
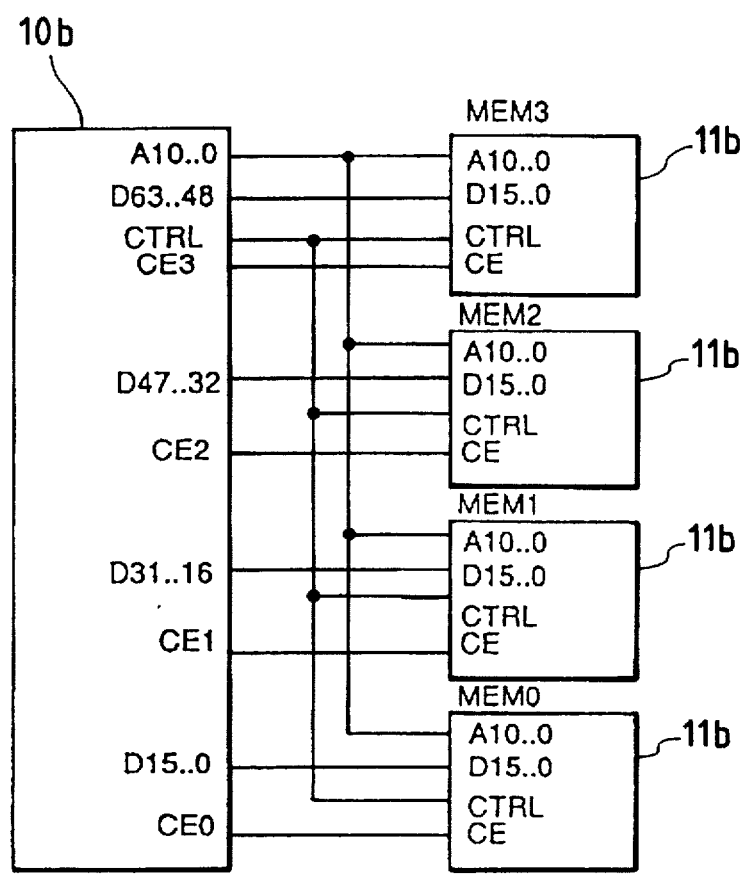
FIG. 46 is a diagram illustrating an association between an image processing processor and a memory.

FIG. 46 shows a relationship between the image processing processor 10b and the high speed memory 11b. The address lines used in common and the data lines are separately wired. The signals, such as RAS and CAS, are transmitted via the common wirings, and the signals for read-write control and chip select are transmitted via separate wirings. Through this provision a separate row address setting and separate read-write settings for every chip module can be realized.

Figure 47:
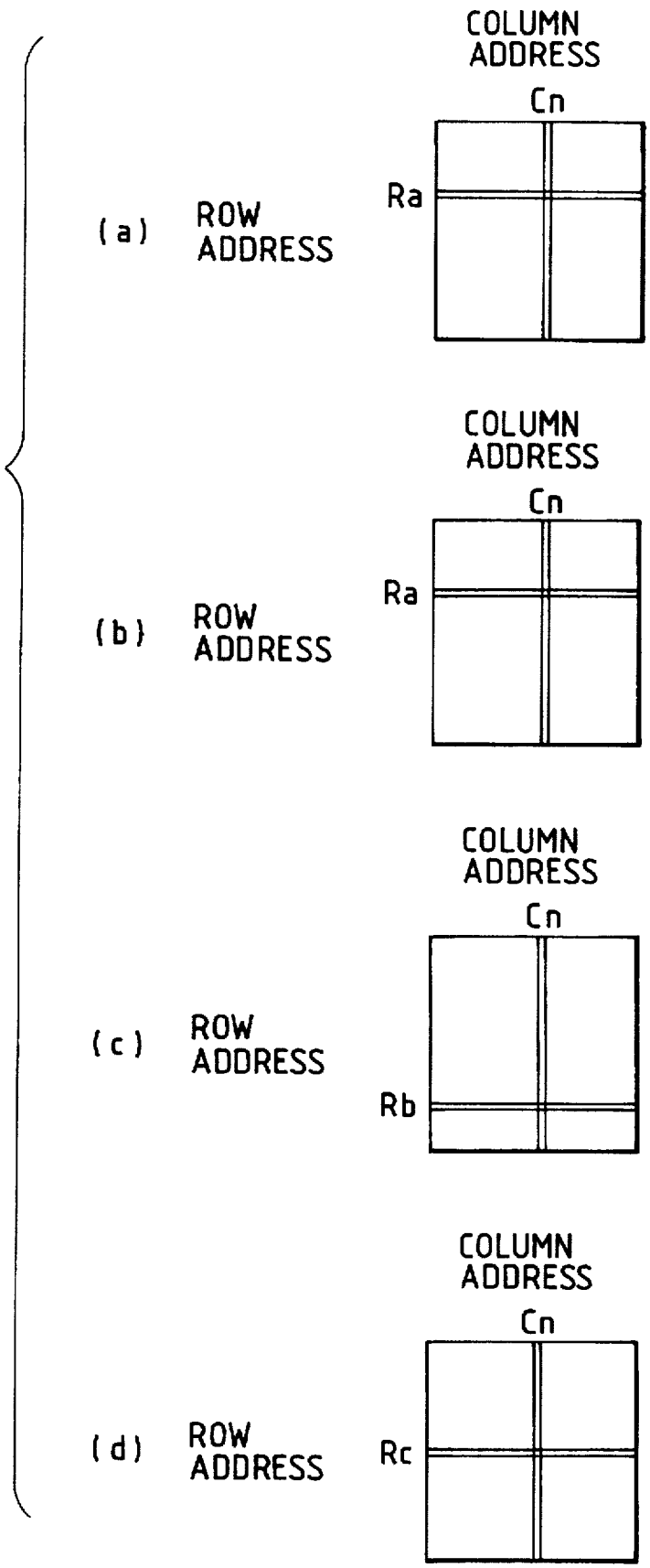
FIG. 47 is a diagram conceptually illustrating a manner of row address setting.

FIG. 47 shows generally a manner of setting different row addresses for a memory module. FIGS. 47(a) through (d) schematically represent respective read-out addresses among the 64 bit bus. When setting a row address, it is possible to set separate row addresses by controlling the chip select. In FIGS. 47(a) and (b) the row addresses are set at Ra, and in FIGS. 47(c) and (d) the row addresses are set respectively at Rb and Rc so that it is possible to access separate row addresses.

Accordingly, by simultaneously accessing the SDRAM via the bus dividing mode, a high speed image processing in a facsimile machine is realized, a low cost and high performance facsimile machine is provided.

Figure 48:
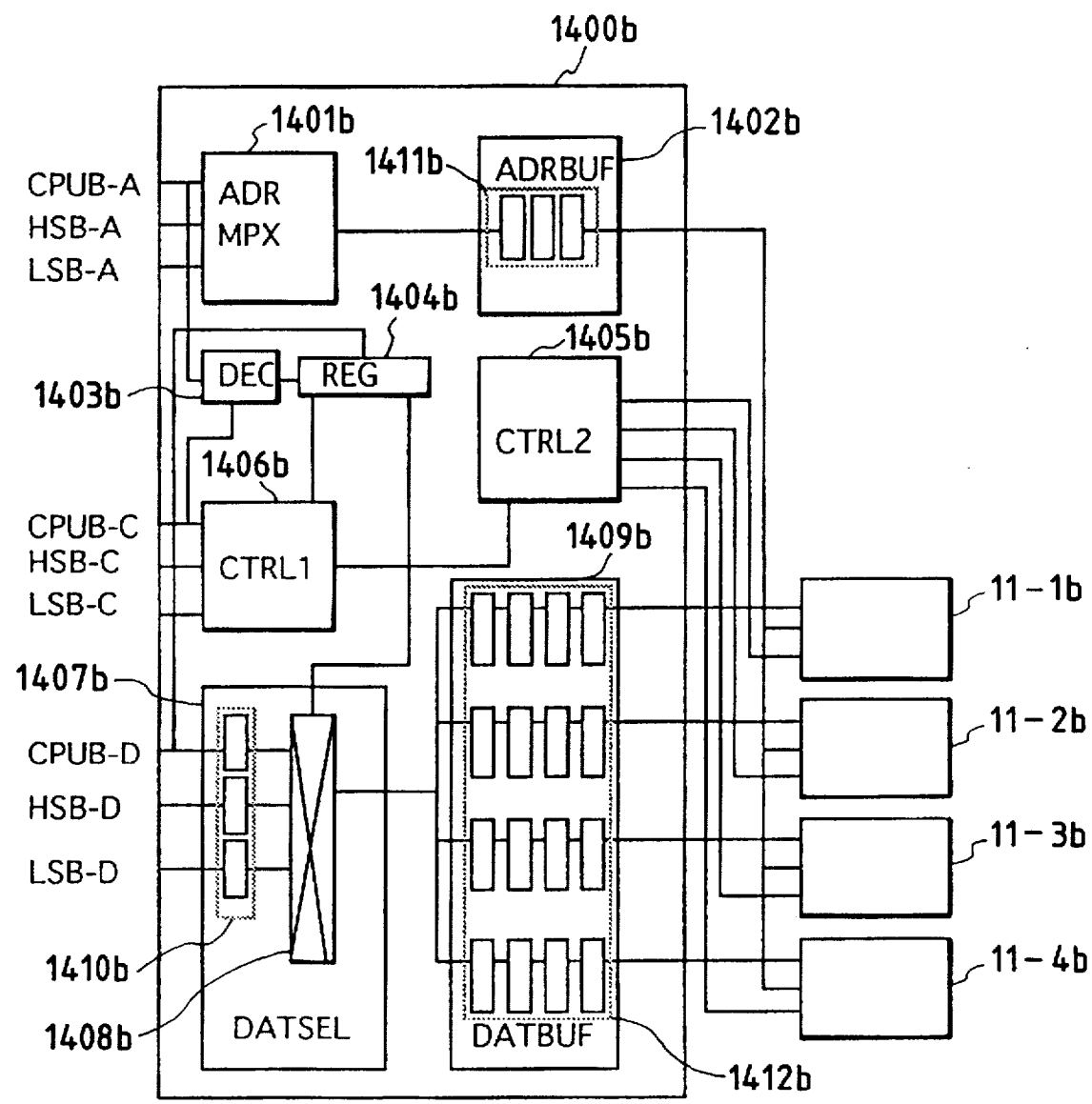
FIG. 48 is a block diagram illustrating a bus control unit.

FIG. 48 shows a detailed block diagram of the bus control unit MBU as shown in FIG. 43. The bus control unit MBU is an interface for three buses of the CPU bus CPUS, the high speed bus HSB and the low speed bus LSB, and for the high speed memory 11b. The bus control unit MBU performs adjustment, allotment and sizing for the three buses. An address multiplexer 1401b is connected to receive address signals CPUB-A, HSB-A and LSB-A of the respective buses, separates the row addresses and column addresses and transfers the same to an address buffer 1402b. In the address buffer 1402b the row addresses are latched at the address register 1411b. In a first memory control unit 1406b control signals CPUB-C, HSB-C and LSB-C of the respective buses are input and signals of bus request, response, selection, read and write are exchanged. In response to this control status, a second memory control unit 1405b determines at which module in the high speed memory a row address in the address buffer 1402b is to be set and selectively performs the control. In the data selection unit 1407b, the input data signals CPUB-D, HSB-D and LSB-D for the respective buses are subjected to bus sizing and are transferred to the data buffer 1409b, after the data is rearranged. The data rearrangement is performed by a latch 1410b and a selector 1408b. At what time and to which bus how many data are to be provided is determined according to the command from the register 1404b. The register 1404b is mapped according to the I/O address from the CPU bus CPUB and is modified by decoding the addresses of the CPU bus CPUB using the decoder 1403b and by latching the CPU data CPUB-D. Based on the contents of the register 1404b, the operation of the first memory control unit 1406b and the multiplexer 1406b is determined. The data buffer 1409b performs buffering on the arrangement of the data inputted or outputted in and from the respective memory modules 11-1b~11-4b.

As explained hereinabove, according to the present invention, a great amount of data can be processed at high speed and in real time.

Further, the amount of data transferred between the memory device and the image processing device is minimized and thereby a high speed processing is realized.

Still further, the amount of data transferred between the memory device and the image processing device is minimized and the drawing suppression processing (hidden surface processing) caused by graphics overlapping is reduced, and so in particular, a complex image processing and a three dimensional graphics display processing can be performed at high speed.

Still further, an increase of components for the image processing system which permits access to memories at high speed is suppressed and the cost thereof is lowered.

Still further, the capacity of the data storage region in which the drawing use data is stored is reduced.

Still further, three dimensional graphics which realizes a high speed drawing processing can be displayed.

Still further, the image input and output processing, the coding and decoding processing and the communication processing, which were conventionally performed independently, are integrated, and further, the high speed local processing use memory and the large capacity memory are integrated, so that a high speed image processing system of low cost can be provided.

We claim:

1. A data processor, comprising: a block buffer for holding pixel data accessed from a memory in block units, and processing means responsive to the processing status of pixel data of every one of respective rows in said block buffer for executing a command with regard to image processing to effect processing of the pixel data.

2. A data processor according to claim 1 further characterized, in that, based on the processing status of the pixel data to be processed, the pixel data to be processed next is specified.

3. A data processor according to claim 2 comprising a command buffer which holds commands buffer which accesses pixel data held in a memory in a pixel data processing unit which executes a processing of the pixel data in said block buffer based on a command and detects the processing status of the pixel data of the respective rows in said block buffer, and a status register which holds processing status information indicating the processing status of the pixel data of the respective rows whereby the processing of the pixel data in each of the blocks is executed based on the commands and the processing status information.

4. A data processor according to claim 3 characterized in that the processing status information represented processing status of block pixel data at the boundaries of the respective rows.

5. A data processor according to claim 4 whereby the pixel data to be processed next is specified based on the processing status information.

6. A data processor according to claim 3 whereby the pixel data to be processed next is specified based on the processing status information.

7. A data processor according to claim 1 further comprising a command buffer which holds commands indicating processings relating to drawings, a pixel data processing unit which executes a processing of the pixel data in said block buffer based on a command and detects the processing status of the pixel data of the respective rows in said block buffer, and a status register which holds processing status information indicating the processing status of the pixel data of the respective rows whereby the processing of the pixel data in each of the blocks is executed based on the commands and the processing status information.

8. A data processor according to claim 7 characterized in that the processing status information represent the processing status of pixel data at the block boundaries of respective rows.

9. A data processor according to claim 8 whereby the pixel data to be processed next is specified based on the processing status information.

10. A data processor according to claim 7 whereby the pixel data to be processed next is specified based on the processing status information.

11. A data processing device, comprising a memory which holds pixel data; a data processor which executes processing based on the processing status of pixel data of every one of respective rows in block buffer which holds pixel data accessed from said memory in block units, in response to command with regard to image processing, on the pixel data, writes the same in said memory and performs a control for outputting the pixel data held in said memory; and an output displaying device which outputs and displays the pixel data held in said memory.

12. A data processing device according to claim 11, wherein said data processor includes means responsive to the processing status of the pixel data to be processed in said block buffer for specifying the pixel data to be processed next, for writing the same in said memory and for performing a control for outputting the pixel data held in said memory.

13. A data processing device according to claim 11, wherein said data processor further comprises a command buffer which holds commands indicating processings relating to drawings, and a status register which holds processing status information indicating the processing status of the pixel data and means for executing the processing of the pixel data in each of the blocks based on the commands in said command buffer and the processing status information and for renewing the processing status information with the processing of the pixel data via said command buffer.

14. A data processing device according to claim 13 whereby the processing status information represent the processing status of the pixel data at the block boundaries of the respective rows.

15. A data processing device according to claim 14 wherein the pixel data to be processed next is specified based on the processing status information.

16. A data processing device according to claim 13 wherein the pixel data to be processed next is specified based on the processing status information.

* * * * *